(12) United States Patent
Kim et al.

(10) Patent No.: US 12,323,605 B2
(45) Date of Patent: Jun. 3, 2025

(54) METHOD AND DEVICE FOR PROCESSING VIDEO SIGNAL ON BASIS OF INTRA PREDICTION

(71) Applicant: HUMAX CO., LTD., Yongin-Si (KR)

(72) Inventors: Dongcheol Kim, Suwon-Si (KR); Geonjung Ko, Seoul (KR); Jaehong Jung, Seoul (KR); Juhyung Son, Uiwang-Si (KR); Jinsam Kwak, Uiwang-si (KR)

(73) Assignee: HUMAX CO., LTD., Yongin-Si (KR)

( * ) Notice: Subject to any disclaimer, the term of this patent is extended or adjusted under 35 U.S.C. 154(b) by 300 days.

(21) Appl. No.: 17/607,001

(22) PCT Filed: Apr. 27, 2020

(86) PCT No.: PCT/KR2020/005541
§ 371 (c)(1),
(2) Date: Oct. 27, 2021

(87) PCT Pub. No.: WO2020/222484
PCT Pub. Date: Nov. 5, 2020

(65) Prior Publication Data
US 2022/0217366 A1  Jul. 7, 2022

(30) Foreign Application Priority Data

Apr. 27, 2019 (KR) .................. 10-2019-0049454
May 30, 2019 (KR) .................. 10-2019-0063527
Jun. 21, 2019 (KR) .................. 10-2019-0074416

(51) Int. Cl.
*H04N 19/186* (2014.01)
*H04N 19/11* (2014.01)
(Continued)

(52) U.S. Cl.
CPC .......... *H04N 19/186* (2014.11); *H04N 19/11* (2014.11); *H04N 19/176* (2014.11); *H04N 19/593* (2014.11); *H04N 19/70* (2014.11)

(58) Field of Classification Search
CPC .... H04N 19/11; H04N 19/176; H04N 19/186; H04N 19/593; H04N 19/70; H04N 19/12; H04N 19/159; H04N 19/61
(Continued)

(56) References Cited

U.S. PATENT DOCUMENTS 11,134,257 B2 * 9/2021 Zhao .................. H04N 19/11
2007/0211797 A1  9/2007 Kim et al.
(Continued)

FOREIGN PATENT DOCUMENTS

CN       107483938 A    12/2017
CN       109479129 A    3/2019
(Continued)

OTHER PUBLICATIONS

Bross, Benjamin et al. Versatile Video Coding (Draft 5), Joint Video Experts Team (JVET) of ITU-T SG 16 WP 3 and ISO/IEC JTC 1/SC 29/WG 11, 14th Meeting: Geneva, CH, [Document JVET-N1001-v10], pp. 1-394, Mar. 27, 2019, pp. 34, 56, 120, 127, 133, 141, 244, 245.
(Continued)

*Primary Examiner* — Behrooz M Senfi
(74) *Attorney, Agent, or Firm* — BROADVIEW IP LAW, PC

(57) ABSTRACT

Disclosed are a video signal processing method and device for encoding or decoding a video signal. The video signal processing method and the video signal processing method may include inducing a chroma intra prediction mode applied to a current chroma block based on a luma intra prediction mode of a luma block corresponding to the
(Continued)

current chroma block, generating a chroma prediction sample of the current chroma block based on the chroma intra prediction mode, and restoring the current chroma block based on the chroma prediction sample.

18 Claims, 19 Drawing Sheets

(51) Int. Cl.
    *H04N 19/176* (2014.01)
    *H04N 19/593* (2014.01)
    *H04N 19/70* (2014.01)
(58) Field of Classification Search
    USPC .................................................. 375/240.02
    See application file for complete search history.

(56) References Cited

U.S. PATENT DOCUMENTS

| | | | |
|---|---|---|---|
| 2014/0314142 A1 | | 10/2014 | Oh et al. |
| 2015/0085924 A1 | | 3/2015 | Gamei et al. |
| 2016/0337661 A1 | * | 11/2016 | Pang ................ H04N 19/523 |
| 2017/0359595 A1 | | 12/2017 | Zhang et al. |
| 2018/0160130 A1 | | 6/2018 | Oh et al. |
| 2018/0310000 A1 | | 10/2018 | Heo et al. |
| 2019/0222837 A1 | | 7/2019 | Lee et al. |
| 2020/0359033 A1 | | 11/2020 | Ramasubramonian et al. |
| 2022/0038744 A1 | | 2/2022 | Nam et al. |

FOREIGN PATENT DOCUMENTS

| | | | | |
|---|---|---|---|---|
| KR | 10-2012-0129944 A | | 11/2012 | |
| KR | 10-2016-0132869 A | | 11/2016 | |
| WO | 2018064948 A1 | | 4/2018 | |
| WO | WO-2019098464 A1 | * | 5/2019 | ............. H04N 19/11 |
| WO | WO-2019183986 A1 | * | 10/2019 | ............ H04N 19/105 |
| WO | WO-2019194500 A1 | * | 10/2019 | ............ H04N 19/105 |
| WO | WO-2020016748 A1 | * | 1/2020 | ............ H04N 19/105 |
| WO | WO-2020207502 A1 | * | 10/2020 | ............ H04N 19/105 |
| WO | WO-2020211765 A1 | * | 10/2020 | ............. H04N 19/11 |
| WO | WO-2020213945 A1 | * | 10/2020 | ............. H04N 19/11 |
| WO | 2020/221203 A1 | | 11/2020 | |
| WO | 2020/249633 A1 | | 12/2020 | |

OTHER PUBLICATIONS

Said, Amir et al. Non-Separable Secondary Transform Implementations with Reduced Memory via Hierarchically Structured Matrix-based Transforms, Joint Video Experts Team (JVET) of ITU-T SG 16 WP 3 and ISO/IEC JTC 1/SC 29/WG 11, 10th Meeting: San Diego, US, [Document: JVET-J0062-v3], pp. 1-3, Apr. 20, 2018.
Non-Final Office Action for IN202127051213 by Intellectual Property India dated Jun. 5, 2022.
Written Opinion for PCT/KR2020/005541 by International Searching Authority dated Jul. 27, 2020.
Moonmo Koo et al., CE6: Reduced Secondary Transform (RST) (CE6-3.1), JVET-N0193, Joint Video Experts Team (JVET) of ITU-T SG 16 WP 3 and ISO/IEC JTC 1/SC 29/WG 11 14th Meeting: Geneva, CH, Mar. 19-27, 2019.
Jonathan Pfaff et al., CE3: Affine linear weighted intra prediction (CE3-4.1, CE3-4.2), JVET-N0217, Joint Video Experts Team (JVET) of ITU-T SG 16 WP 3 and ISO/IEC JTC 1/SC 29/WG 11 14th Meeting: Geneva, CH, Mar. 19-27, 2019.
Benjamin Bross et al., Versatile Video Coding (Draft 5), JVET-N1001, Joint Video Experts Team (JVET) of ITU-T SG 16 WP 3 and ISO/IEC JTC 1/SC 29/WG 11 14th Meeting: Geneva, CH, Mar. 19-27, 2019.
International Search Report & Written Opinion of the International Searching Authority dated Jul. 27, 2020.
Hearing Notice for IN 202127051213 by Intellectual Property India dated Sep. 6, 2023.
Office Action for VN 1-2021-07572 by Intellectual Property Office of Vietnam dated Sep. 11, 2023.
Office Action and Search Report for CN 202080031899.7 by China National Intellectual Property Administration dated Dec. 7, 2023.
Bross, Benjamin et al. "Versatile Video Coding (Draft 5)". Document: JVET-N1001-v1. Joint Video Experts Team (JVET) of ITU-T SG 16 WP 3 and ISO/IEC JTC 1/SC 29/WG 11. 14th Meeting: Geneva, CH, Mar. 19-27, 2019.
Bross, Benjamin et al. "Versatile Video Coding (Draft 3)". Document: JVET-L1001-v1. Joint Video Experts Team (JVET) of ITU-T SG 16 WP 3 and ISO/IEC JTC 1/SC 29/WG 11. 12th Meeting: Macao, CN, Oct. 3-12, 2018.
Office Action for CN 202080031899.7 by China National Intellectual Property Administration dated May 9, 2024.
Notice of Allowance for CN 202080031899.7 by China National Intellectual Property Administration dated Jul. 16, 2024.

* cited by examiner

*Input: ( bdry$_{top}$, bdry$_{left}$ )*         *Output: pred*

Fig. 16

| | |
|---|---|
| if( CuPredMode[ x0 ][ y0 ] == MODE_INTRA ) { | |
|   if( sps_pcm_enabled_flag &&<br>    cbWidth >= MinIpcmCbSizeY && cbWidth <= MaxIpcmCbSizeY &&<br>    cbHeight >= MinIpcmCbSizeY && cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |
|   } else { | |
|     if( treeType == SINGLE_TREE || treeType == DUAL_TREE_LUMA ) { | |
|       if( Abs( Log2( cbWidth ) – Log2( cbHeight ) ) <= 2 && (cbWidht <=<br>      INTRA_MIP_MAX_WIDTH && cbHeight <= INTRA_MIP_MAX_HEIGHT)) | |
|       intra_lwip_flag[ x0 ][ y0 ] | ae(v) |
|       if( intra_lwip_flag[ x0 ][ y0 ] ) { | |
|         intra_lwip_mpm_flag[ x0 ][ y0 ] | ae(v) |
|         if( intra_lwip_mpm_flag[ x0 ][ y0 ] ) | |
|           intra_lwip_mpm_idx[ x0 ][ y0 ] | ae(v) |
|         else | |
|           intra_lwip_mpm_remainder[ x0 ][ y0 ] | ae(v) |
|       } else { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0 &&<br>        ( cbWidth <= MaxTbSizeY || cbHeight <= MaxTbSizeY ) &&<br>        ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 &&<br>        cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] == 0 &&<br>        intra_subpartitions_mode_flag[ x0 ][ y0 ] == 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|     } | |
|     if( treeType == SINGLE_TREE || treeType == DUAL_TREE_CHROMA ) | |
|       intra_chroma_pred_mode[ x0 ][ y0 ] | ae(v) |
|   } | |
| } else if( treeType != DUAL_TREE_CHROMA ) { /* MODE_INTER or MODE_IBC */ | |

| | |
|---|---|
| if( CuPredMode[ x0 ][ y0 ] == MODE_INTRA ) { | |
|   if( sps_pcm_enabled_flag && <br>     cbWidth >= MinIpcmCbSizeY && cbWidth <= MaxIpcmCbSizeY && <br>     cbHeight >= MinIpcmCbSizeY && cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |
|   } else { | |
|     if( treeType == SINGLE_TREE || treeType == DUAL_TREE_LUMA ) { | |
|       if( Abs( Log2( cbWidth ) - Log2( cbHeight ) ) <= 2 && (cbWidht <= INTRA_MIP_MAX_ <br>       WIDTH && cbHeight <= INTRA_MIP_MAX_HEIGHT) && sps_mip_enabled_flag) | |
|         intra_lwip_flag[ x0 ][ y0 ] | ae(v) |
|       if( intra_lwip_flag[ x0 ][ y0 ] ) { | |
|         intra_lwip_mpm_flag[ x0 ][ y0 ] | ae(v) |
|         if( intra_lwip_mpm_flag[ x0 ][ y0 ] ) | |
|           intra_lwip_mpm_idx[ x0 ][ y0 ] | ae(v) |
|         else | |
|           intra_lwip_mpm_remainder[ x0 ][ y0 ] | ae(v) |
|       } else { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0 && <br>           ( cbWidth <= MaxTbSizeY || cbHeight <= MaxTbSizeY ) && <br>           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 && <br>           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] == 0 && <br>           intra_subpartitions_mode_flag[ x0 ][ y0 ] == 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|     } | |
|     if( treeType == SINGLE_TREE || treeType == DUAL_TREE_CHROMA ) | |
|       intra_chroma_pred_mode[ x0 ][ y0 ] | ae(v) |
|   } | |
| } else if( treeType != DUAL_TREE_CHROMA ) { /* MODE_INTER or MODE_IBC */ | |

```
if( cu_cbf ) {
  if( CuPredMode[ x0 ][ y0 ] == MODE_INTER && sps_sbt_enabled_flag && !ciip_flag[ x0 ][ y0 ] ) {
    if( cbWidth <= MaxSbtSize && cbHeight <= MaxSbtSize ) {
      allowSbtVerH = cbWidth >= 8
      allowSbtVerQ = cbWidth >= 16
      allowSbtHorH = cbHeight >= 8
      allowSbtHorQ = cbHeight >= 16
      if( allowSbtVerH || allowSbtHorH || allowSbtVerQ || allowSbtHorQ )
        cu_sbt_flag
    }
    if( cu_sbt_flag ) {
      if( ( allowSbtVerH || allowSbtHorH ) && ( allowSbtVerQ || allowSbtHorQ ) )
        cu_sbt_quad_flag
      if( ( cu_sbt_quad_flag && allowSbtVerQ && allowSbtHorQ ) ||
          ( !cu_sbt_quad_flag && allowSbtVerH && allowSbtHorH ) )
        cu_sbt_horizontal_flag
      cu_sbt_pos_flag
    }
  }
  numZeroOutSigCoeff = 0
  transform_tree( x0, y0, cbWidth, cbHeight, treeType )
          if( Min( cbWidth, cbHeight ) >= 4 && sps_st_enabled_flag
          == 1 && CuPredMode[ x0 ][ y0 ] == MODE_INTRA
S1801 ─── && IntraSubPartitionsSplitType == ISP_NO_SPLIT
          && (!intra_lwip_flag[x0][y0] ) ) {
              if( ( numSigCoeff > ( ( treeType == SINGLE_TREE ) ? 2
: 1 ) ) &&
              numZeroOutSigCoeff == 0 ) {
                  st_idx[ x0 ][ y0 ]
              }
          }
  }
 }
}
```

Fig. 19

```
residual_coding( x0, y0, log2TbWidth, log2TbHeight, cIdx ) {
    if( sig_coeff_flag[ xC ][ yC ] ) {
        if( !transform_skip_flag[ x0 ][ y0 ] ) {
            numSigCoeff++
            if((!intra_lwip_flag[x0][y0] ) &&((( ( log2TbWidth == 2 && log2TbHeight == 2 ) ||
                ( log2TbWidth == 3 && log2TbHeight == 3 ) ) && n >= 8 && i == 0 ) ||
                ( log2TbWidth >= 3 && log2TbHeight >= 3 && ( i == 1 || i == 2 )))) { numZeroOutSigCoeff++
            }
        }
        abs_level_gt1_flag[ n ]
        remBinsPass1- -
        if( abs_level_gt1_flag[ n ] ) {
            par_level_flag[ n ]
```

S1901 points to the highlighted condition.

Fig. 20

```
residual_coding( x0, y0, log2TbWidth, log2TbHeight, cIdx ) {
    if( sig_coeff_flag[ xC ][ yC ] ) {
        if( !transform_skip_flag[ x0 ][ y0 ] && (!intra_lwip_flag[x0][y0] )) {
            numSigCoeff++
            if( ( ( ( log2TbWidth == 2 && log2TbHeight == 2 ) || ( log2TbWidth == 3 && log2
                TbHeight == 3 ) ) && n >= 8 && i == 0 ) ||
                ( log2TbWidth >= 3 && log2TbHeight >= 3 && ( i == 1 || i == 2 ) ) ) { numZeroOutSigCoeff++
            }
        }
        abs_level_gt1_flag[ n ]
        remBinsPass1- -
        if( abs_level_gt1_flag[ n ] ) {
            par_level_flag[ n ]
```

S2001 points to the highlighted condition.

Fig. 21

| transform_unit( x0, y0, tbWidth, tbHeight, treeType, subTuIndex ) { | Descriptor |
|---|---|
| ... | |
| if( tu_cbf_luma[ x0 ][ y0 ] && treeType != DUAL_TREE_CHROMA<br>&& ( tbWidth <= 32 ) && ( tbHeight <= 32 )<br>&& ( IntraSubPartitionsSplit[ x0 ][ y0 ] == ISP_NO_SPLIT ) && ( !cu_sbt_flag ) ) { | |
| if( transform_skip_enabled_flag && tbWidth <= MaxTsSize && tbHeight <= MaxTsSize ) | |
| transform_skip_flag[ x0 ][ y0 ] | ae(v) |
| if( (( CuPredMode[ x0 ][ y0 ] != MODE_INTRA && sps_explicit_mts_inter_enabled_flag )<br>\|\| ( CuPredMode[ x0 ][ y0 ] == MODE_INTRA && sps_explicit_mts_intra_enabled_flag ))<br>&& ( tbWidth <= 32 ) && ( tbHeight <= 32 ) && ( !transform_skip_flag[ x0 ][ y0 ] ) &&<br>(!intra_lwip_flag[x0][y0] )) | |
| tu_mts_idx[ x0 ][ y0 ] | ae(v) |
| } | |
| if( tu_cbf_luma[ x0 ][ y0 ] ) | |
| residual_coding( x0, y0, Log2( tbWidth ), Log2( tbHeight ), 0 ) | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] ) | |
| residual_coding( xC, yC, Log2( wC ), Log2( hC ), 2 ) | |
| } | |

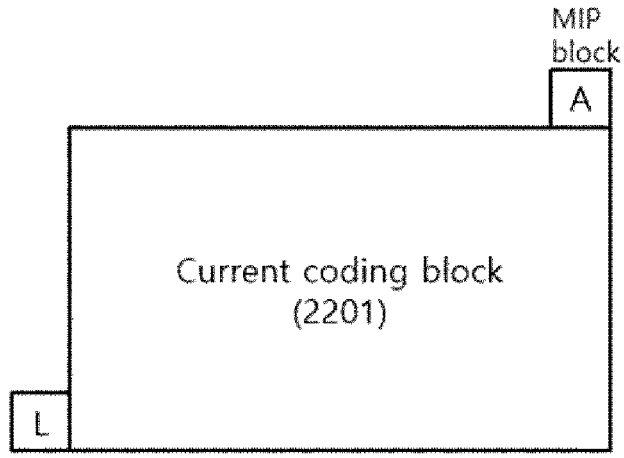

(a)                              (b)

(a)  (b)

METHOD AND DEVICE FOR PROCESSING VIDEO SIGNAL ON BASIS OF INTRA PREDICTION

TECHNICAL FIELD

The present disclosure relates to a video signal processing method and device and, more specifically, to a video signal processing method and device by which a video signal is encoded or decoded based on intra prediction.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

An object of the present invention is to increase the coding efficiency of a video signal. Specifically, an object of the present invention is to provide a method for efficiently inducing an intra prediction mode of a chroma component when matrix-based intra prediction (MIP) is applied to a luma component.

In addition, an object of the present invention is to provide a method for efficiently constructing a most probable mode (MPM) list in consideration of neighboring blocks to which the matrix-based intra prediction (MIP) is applied.

Solution to Problem

In order to solve the above problems, the present invention provides a device and a method for processing a video signal as follows.

According to an embodiment of the present invention, there is provided a method for processing a video signal, including: inducing a chroma intra prediction mode applied to a current chroma block based on a luma intra prediction mode of a luma block corresponding to the current chroma block; generating a chroma prediction sample of the current chroma block based on the chroma intra prediction mode; and restoring the current chroma block based on the chroma prediction sample, in which the luma intra prediction mode is set to a preset specific mode based on whether a matrix-based intra prediction (MIP) mode is applied to the luma block corresponding to the current chroma block.

In an embodiment, whether the MIP mode is applied to the luma block corresponding to the current chroma block may be determined according to a value of an MIP flag of a preset specific luma position, and the MIP flag may indicate whether the MIP mode is applied.

In an embodiment, the preset specific luma position may be a bottom right pixel position of a center of a luma block corresponding to the current chroma block.

In an embodiment, the method may further include: parsing an MIP flag indicating whether the MIP mode is applied to a current luma block; generating a luma prediction sample of the current luma block by applying MIP to the current luma block when the MIP mode is applied to the current luma block; generating a residual block of the current luma block by performing an inverse transform on the current luma block; and restoring the current luma block based on the luma prediction sample and the residual block of the current luma block.

In an embodiment, the generating of the residual block of the current luma block may include determining, based on the MIP flag, whether to use an inverse secondary transform of the current luma block and whether to parse a secondary transform index indicating a transform kernel used for the inverse secondary transform.

In an embodiment, the parsing of the MIP flag may include obtaining a syntax element indicating whether the MIP mode is to be used in a current sequence, and determining whether to parse the MIP flag based on the obtained syntax element.

In an embodiment, the method may further include: generating a most probable mode (MPM) list of the current luma block based on intra prediction modes of neighboring blocks adjacent to a bottom left and a top right of the current luma block, when the MIP mode is not applied to the current luma block; inducing a luma intra prediction mode of the current luma block based on the MPM list; and generating a luma prediction sample of the current luma block by using the luma intra prediction mode.

In an embodiment, when the MIP mode is applied to at least one block among the neighboring blocks adjacent to the bottom left and the top right of the current luma block, the intra prediction mode of the block to which the MIP mode is applied may be set to a preset specific intra prediction mode.

According to an embodiment of the present invention, there is provided a device for processing a video signal, including a processor, in which the processor is configured to induce a chroma intra prediction mode applied to a current chroma block based on a luma intra prediction mode of a luma block corresponding to the current chroma block, generate a chroma prediction sample of the current chroma block based on the chroma intra prediction mode; and restore the current chroma block based on the chroma prediction sample, and the luma intra prediction mode is set to a preset specific mode based on whether a matrix-based intra prediction (MIP) mode is applied to the luma block corresponding to the current chroma block.

In an embodiment, whether the MIP mode is applied to the luma block corresponding to the current chroma block may be determined according to a value of an MIP flag of a preset specific luma position, and the MIP flag may indicate whether the MIP mode is applied.

In an embodiment, the preset specific luma position may be a bottom right pixel position of a center of a luma block corresponding to the current chroma block.

In an embodiment, the processor may be configured to parse an MIP flag indicating whether the MIP mode is applied to a current luma block, generate a luma prediction sample of the current luma block by applying MIP to the current luma block when the MIP mode is applied to the current luma block, generate a residual block of the current luma block by performing an inverse transform on the current luma block, and restore the current luma block based on the luma prediction sample and the residual block of the current luma block.

In an embodiment, the processor may be configured to determine, based on the MIP flag, whether to use an inverse secondary transform of the current luma block and whether to parse a secondary transform index indicating a transform kernel used for the inverse secondary transform.

In an embodiment, the processor may be configured to obtain a syntax element indicating whether the MIP mode is to be used in a current sequence, and determine whether to parse the MIP flag based on the obtained syntax element.

In an embodiment, the processor may be configured to generate a most probable mode (MPM) list of the current luma block based on intra prediction modes of neighboring blocks adjacent to a bottom left and a top right of the current luma block, when the MIP mode is not applied to the current luma block, induce a luma intra prediction mode of the current luma block based on the MPM list, and generate a luma prediction sample of the current luma block by using the luma intra prediction mode.

In an embodiment, when the MIP mode is applied to at least one block among the neighboring blocks adjacent to the bottom left and the top right of the current luma block, the intra prediction mode of the block to which the MIP mode is applied may be set to a preset specific intra prediction mode.

According to an embodiment of the present invention, there is provided a non-transitory computer-executable medium having stored thereon a computer-executable component configured to be executed on one or more processors of a computing device, the computer-executable component performing operations including: inducing a chroma intra prediction mode applied to a current chroma block based on a luma intra prediction mode of a luma block corresponding to the current chroma block; generating a chroma prediction sample of the current chroma block based on the chroma intra prediction mode; and restoring the current chroma block based on the chroma prediction sample, in which the luma intra prediction mode is set to a preset specific mode based on whether a matrix-based intra prediction (MIP) mode is applied to the luma block corresponding to the current chroma block.

Advantageous Effects of Invention

According to embodiments of the present invention, the coding efficiency of a video signal may be increased. According to embodiments of the present invention, complexity may be improved and compression efficiency may be increased by setting an intra prediction mode of a chroma component as a default mode when matrix-based intra prediction (MIP) is applied to a luma component.

In addition, according to embodiments of the present invention, in constructing the most probable mode (MPM) list, the effectiveness of the MPM list construction may be increased and coding efficiency may be improved, by setting, to a preset mode, the prediction mode of a neighboring block to which matrix-based intra prediction (MIP) is applied.

BRIEF DESCRIPTION OF DRAWINGS

FIG. 16 is a diagram illustrating an example of a coding unit syntax structure for describing a method of signaling and obtaining MIP-related information according to an embodiment of the present invention.

FIG. 17 is a diagram illustrating an example of a coding unit syntax structure for describing a method of signaling and obtaining MIP-related information according to an embodiment of the present invention.

FIG. 18 is a diagram illustrating an example of a coding unit syntax structure for describing a method of signaling and obtaining secondary transform-related information according to an embodiment of the present invention.

FIGS. 19 and 20 are diagrams illustrating examples of a residual coding unit syntax structure for describing a method of signaling and obtaining secondary transform-related information according to an embodiment of the present invention.

FIG. 21 is a diagram illustrating an example of a transform unit syntax structure for describing a method of signaling and obtaining transform-related information according to an embodiment of the present invention.

FIG. 22 is a diagram illustrating a method for constructing a most probable mode (MPM) list according to an embodiment of the present invention.

BEST MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
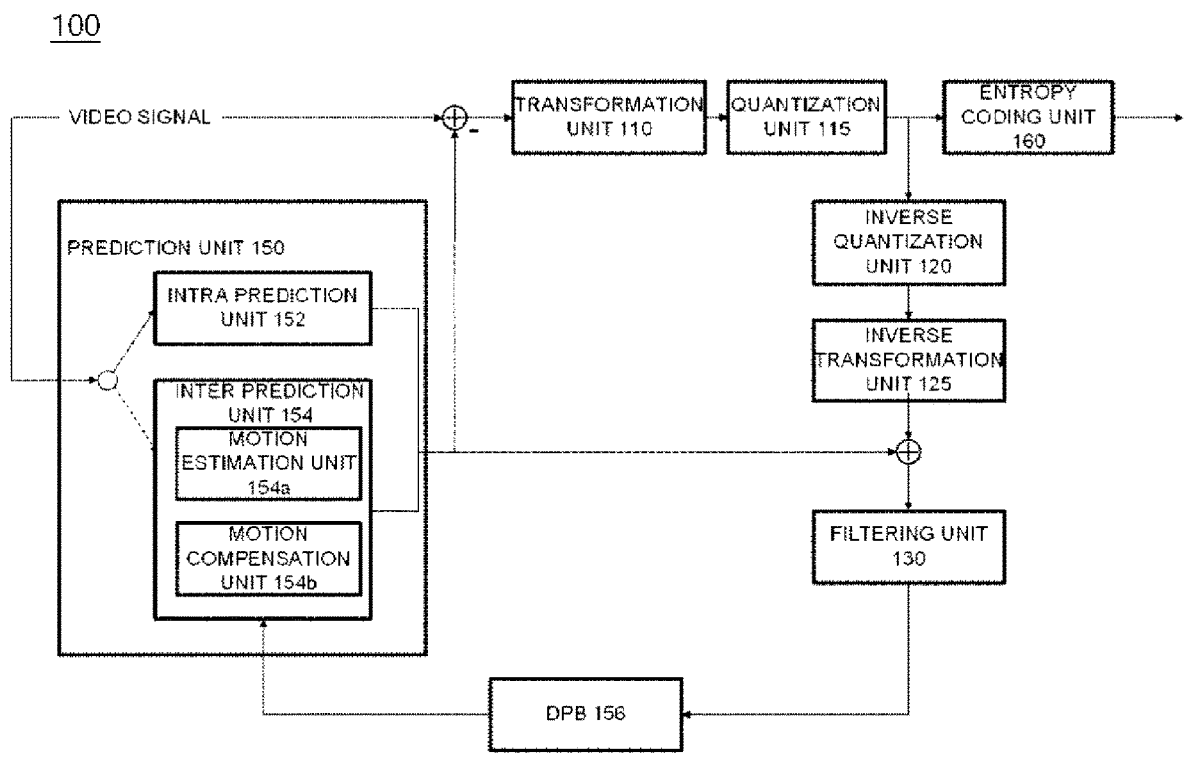
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a*.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
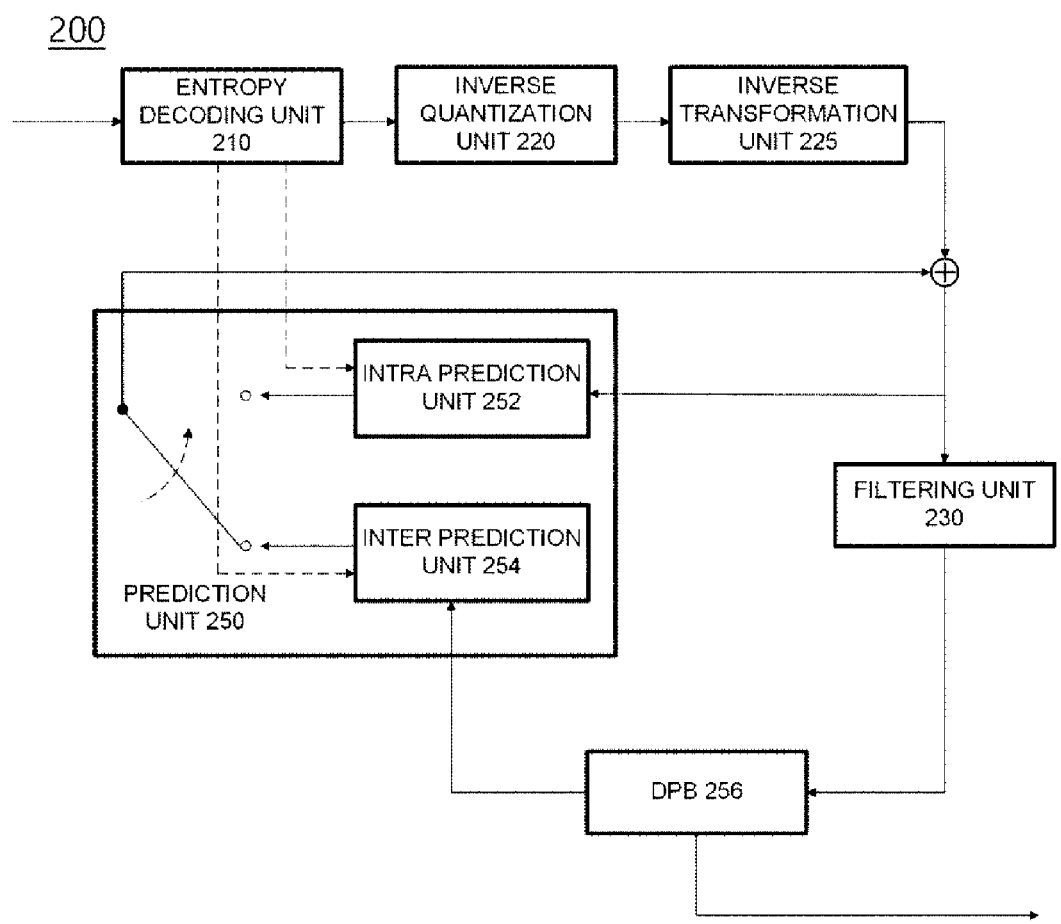
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or top side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
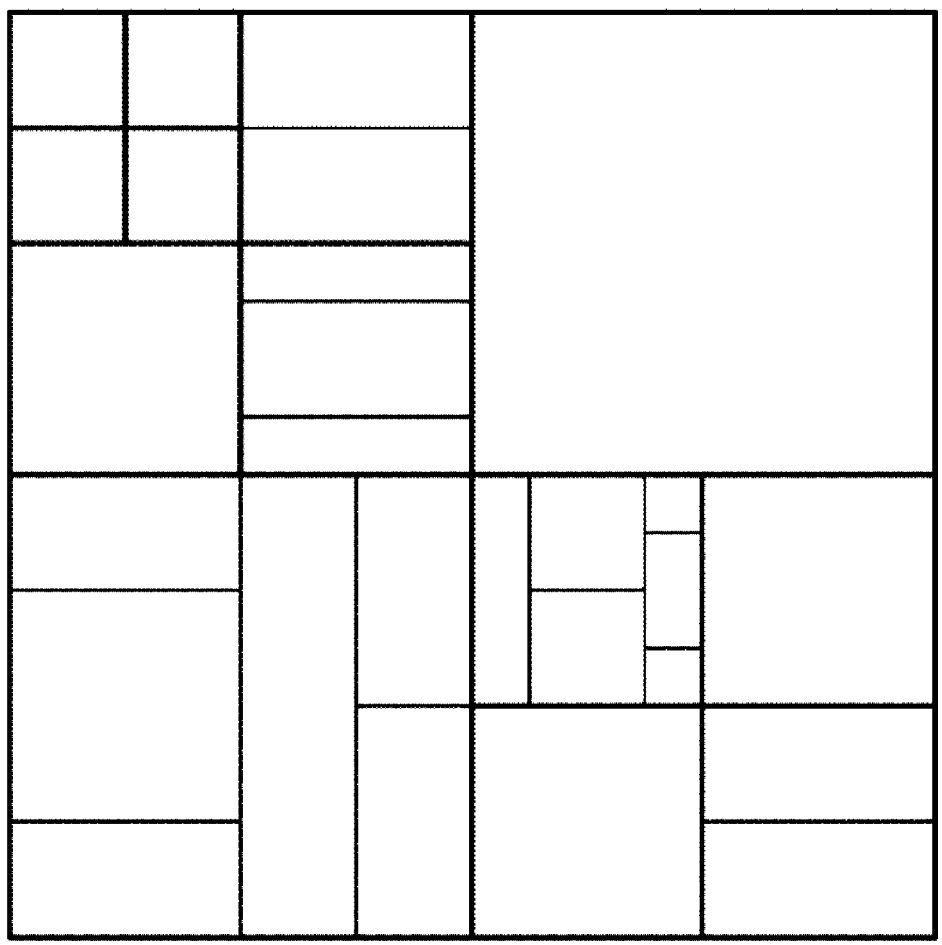
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
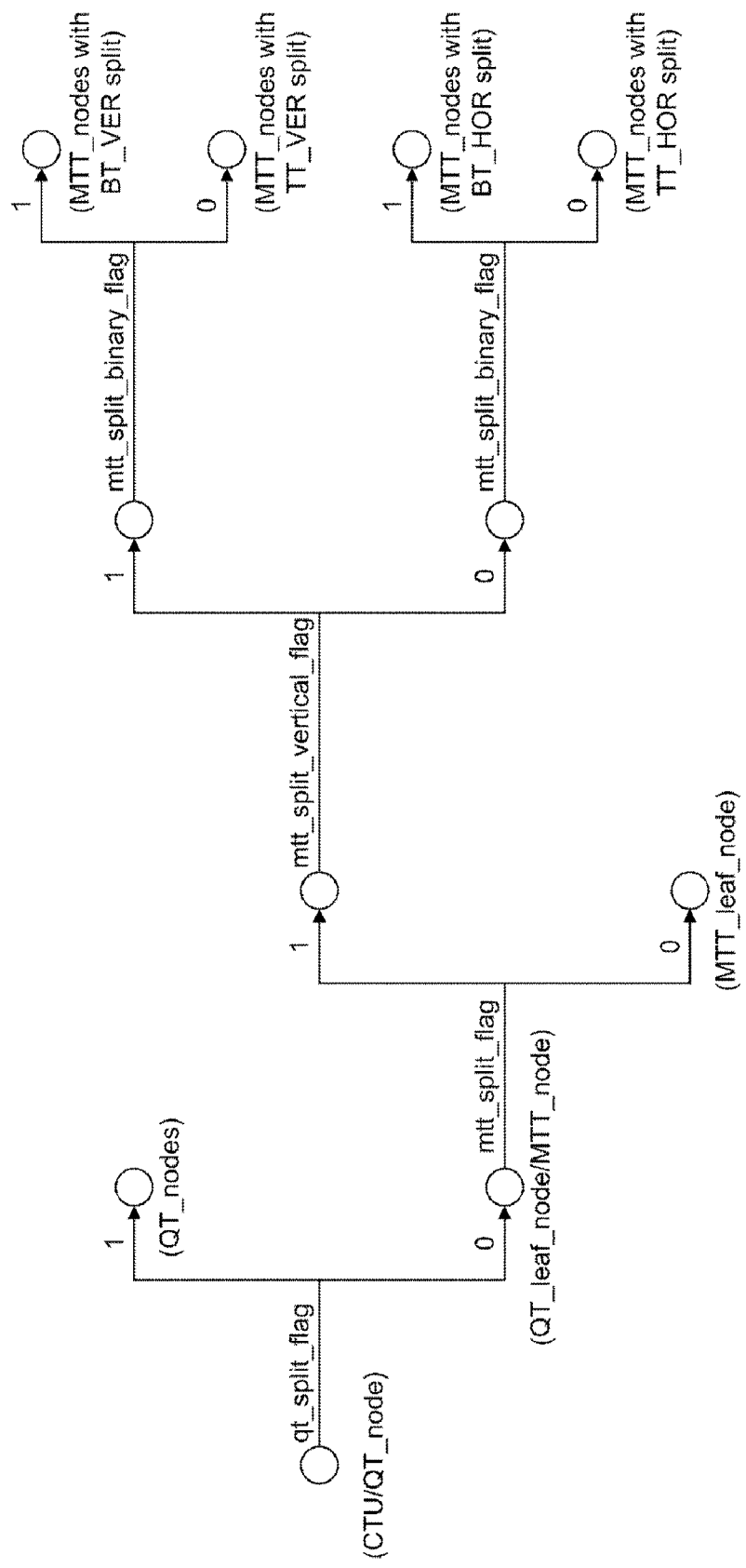
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
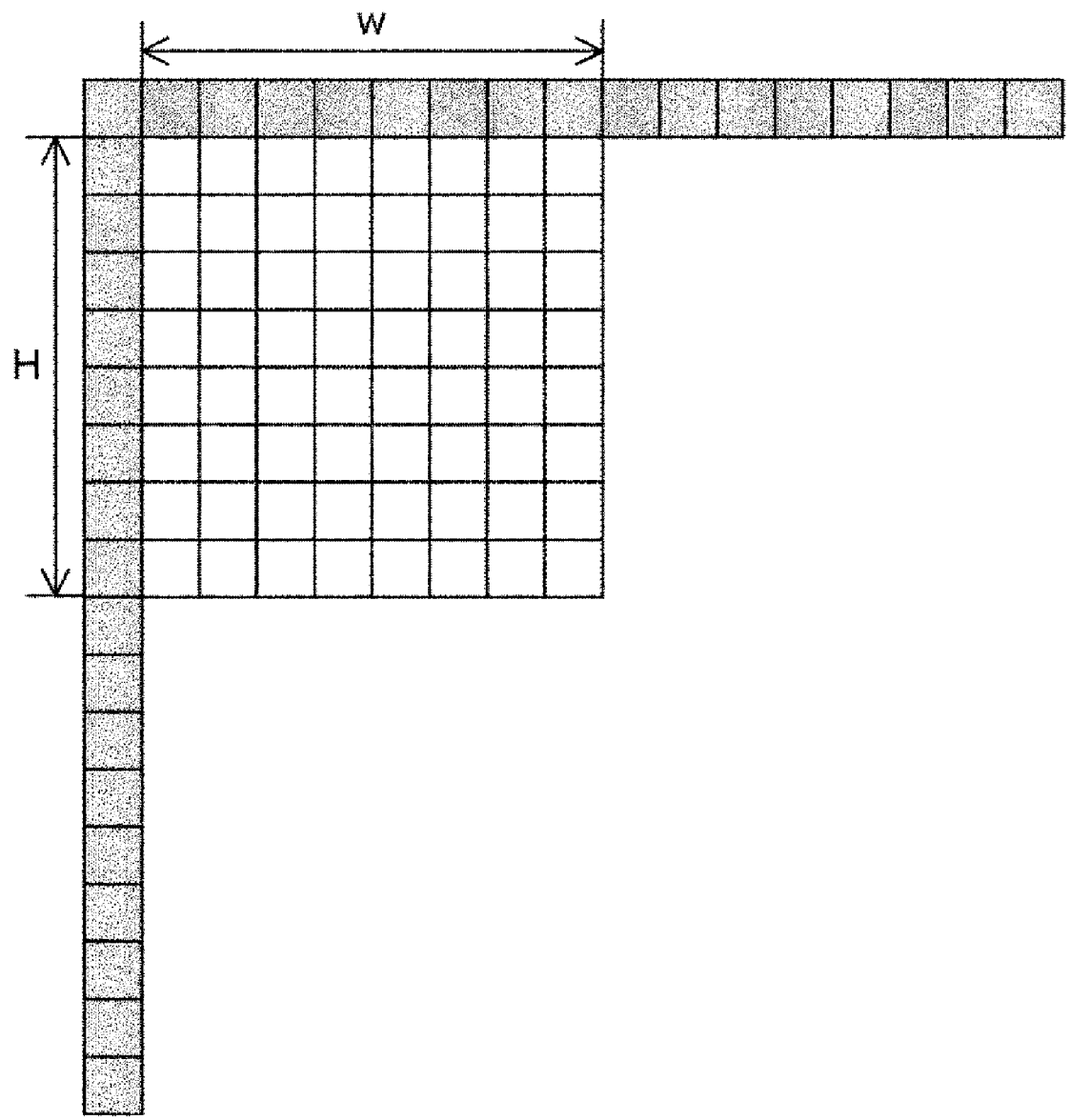
FIGS. 5 and 6 illustrate an intra-prediction method in more detail according to an embodiment of the present disclosure.
Figure 6:
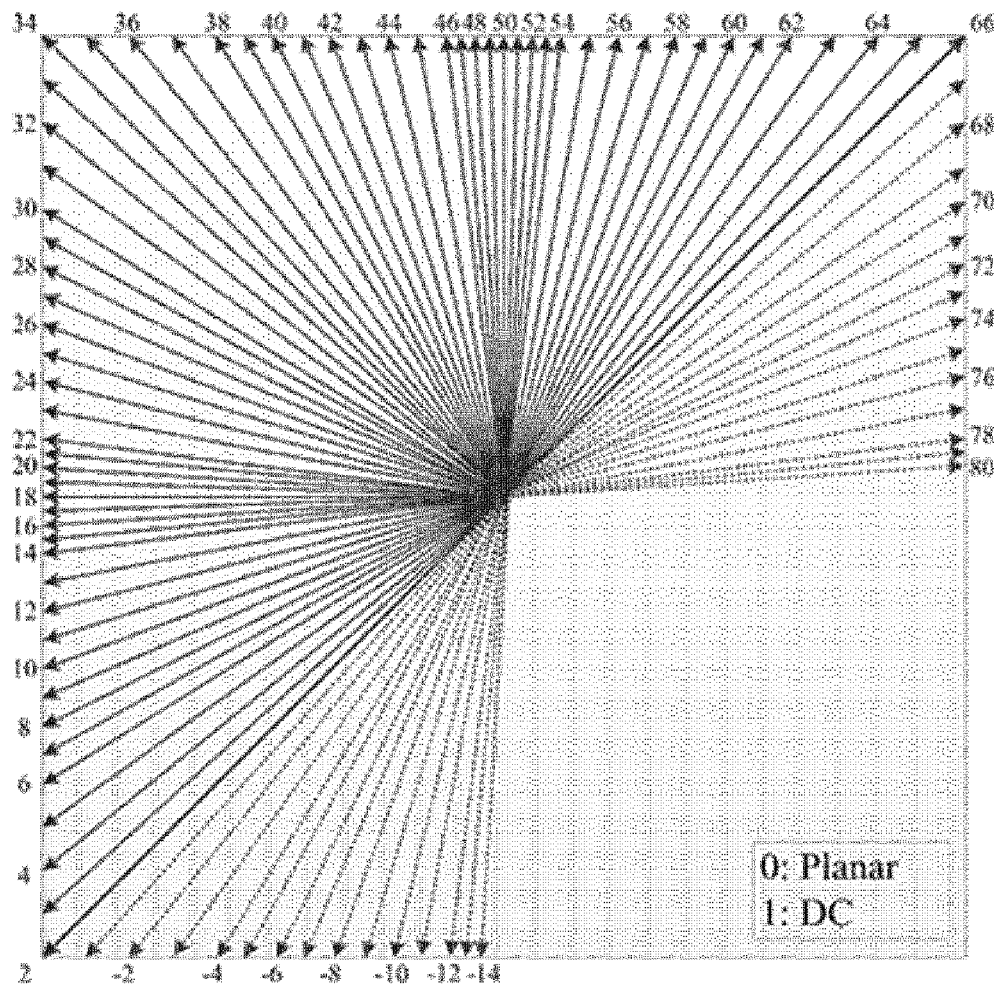

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model. Further, the motion vector may include at least one of a general motion vector for motion compensation according to the general inter prediction method and a control point motion vector for affine compensation.

Figure 7:
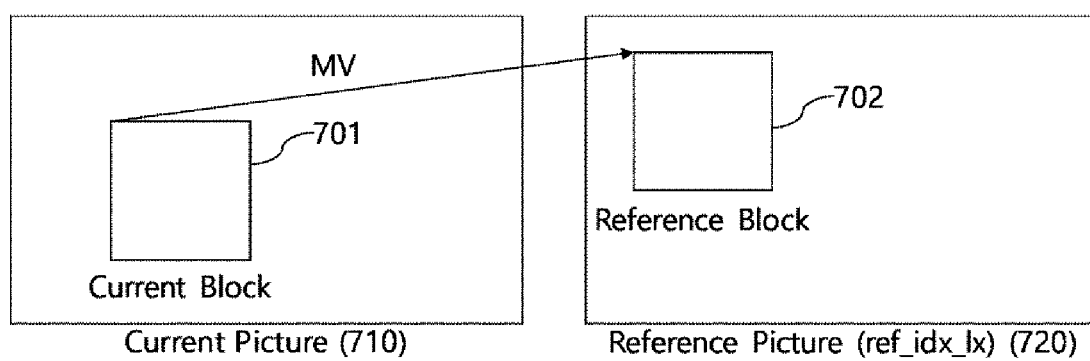
FIG. 7 illustrates an inter prediction method according to an embodiment of the present disclosure.

FIG. 7 illustrates an inter prediction method according to an embodiment of the present disclosure. As described above, the decoder may predict the current block with reference to reconstructed samples of another decoded picture. Referring to FIG. 7, the decoder acquires a reference block 702 within a reference picture 720 on the basis of a motion information set of a current block 701. In this case, the motion information set may include a reference picture index and a motion vector (MV). The reference picture index indicates a reference picture 720 including a reference block for inter prediction of the current block in a reference picture list. According to an embodiment, the reference picture list may include at least one of the L0 picture list or the L1 picture list. The motion vector indicates an offset between a coordinate value of the current block 701 within the current picture 710 and a coordinate value of the reference block 702 within the reference picture 720. The decoder acquires a predictor of the current block 701 on the basis of sample values of the reference block 702 and reconstructs the current block 701 using the predictor.

Specifically, the encoder may acquire the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients acquired through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may acquire two reference blocks on the basis of two motion information sets of the current block. Further, the decoder may acquire a first predictor and a second predictor of the current block on the basis of sample values of the two acquired reference blocks. In addition, the decoder may reconstruct the current block using the first predictor and the second predictor. For example, the decoder may reconstruct the current block on the basis of an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead.

For example, there may be a plurality of candidate blocks that are likely to have been predicted on the basis of a motion information set which is the same as or similar to the motion information set of the current block. The decoder may generate a merge candidate list on the basis of the plurality of candidate blocks. Here, the merge candidate list may include candidates corresponding to samples that are likely to have been predicted on the basis of a motion information set related to the motion information set of the current block, among samples reconstructed earlier than the current block. The encoder and the decoder may configure the merge candidate list of the current block according to a predefined rule. Here, the merge candidate lists respectively configured by the encoder and the decoder may be the same. For example, the encoder and the decoder may configure the merge candidate list of the current block on the basis of a location of the current block in a current picture. A method for configuring a merge candidate list of a current block by the encoder and the decoder will be described with reference to FIG. 9. In the present disclosure, the position of a particular block indicates a relative position of a top-left sample of the particular block in a picture including the particular block.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
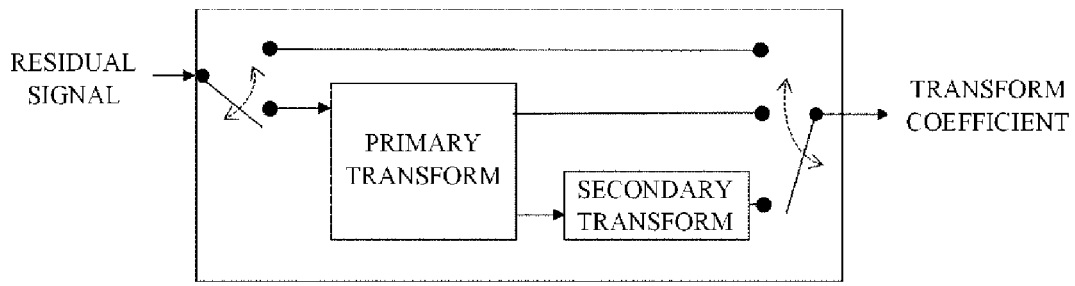
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform a secondary transform may be determined according to the size of a current block or a residual block. In addition, transform kernels with different sizes may be used according to the size of a current block or a residual block. For example, an 8×8 secondary transform may be applied to a block in which the length of a shorter side among the width or the height is equal to or larger than a first pre-configured length. In addition, a 4×4 secondary transform may be applied to a block in which the length of a shorter side among the width or the height is equal to or larger than a second pre-configured length and is smaller than the first pre-configured length. The first pre-configured length may be larger than the second pre-configured length, but the present disclosure is not limited thereto. In addition, a secondary transform may not be divided into a vertical transform and a horizontal transform unlike a primary transform. Such a secondary transform may be called a low frequency non-separable transform (LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted.

Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
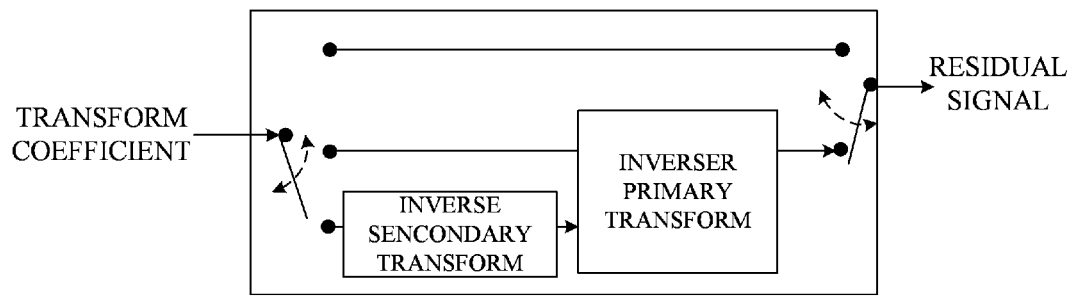
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Figure 10:
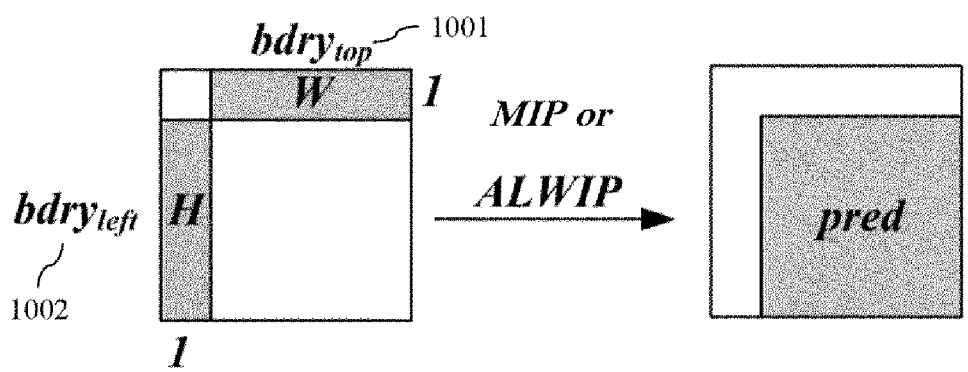
FIG. 10 is a diagram for describing a matrix-based intra prediction method according to an embodiment of the present invention.

FIG. 10 is a diagram for describing a matrix-based intra prediction method according to an embodiment of the present invention.

According to an embodiment of the present invention, as shown in FIG. 10, an encoder/decoder may generate a prediction block for the current block by applying matrix values and offsets based on reference samples adjacent to the left and top sides of the current block. Referring to FIG. 10, bdrytop 1001 indicates reference samples above the current block, and may be denoted by W in FIG. 10. Further, bdryleft 1002 indicates left reference samples of the current block, and may be denoted by H in FIG. 10. As an embodiment, the reference sample line used for the matrix-based intra prediction may be a reference sample line closest to the current block. In the present specification, such a matrix-based intra prediction method may be referred to as matrix-based intra prediction (MIP) or affine linear weighted intra prediction (ALWIP).

Figure 11:
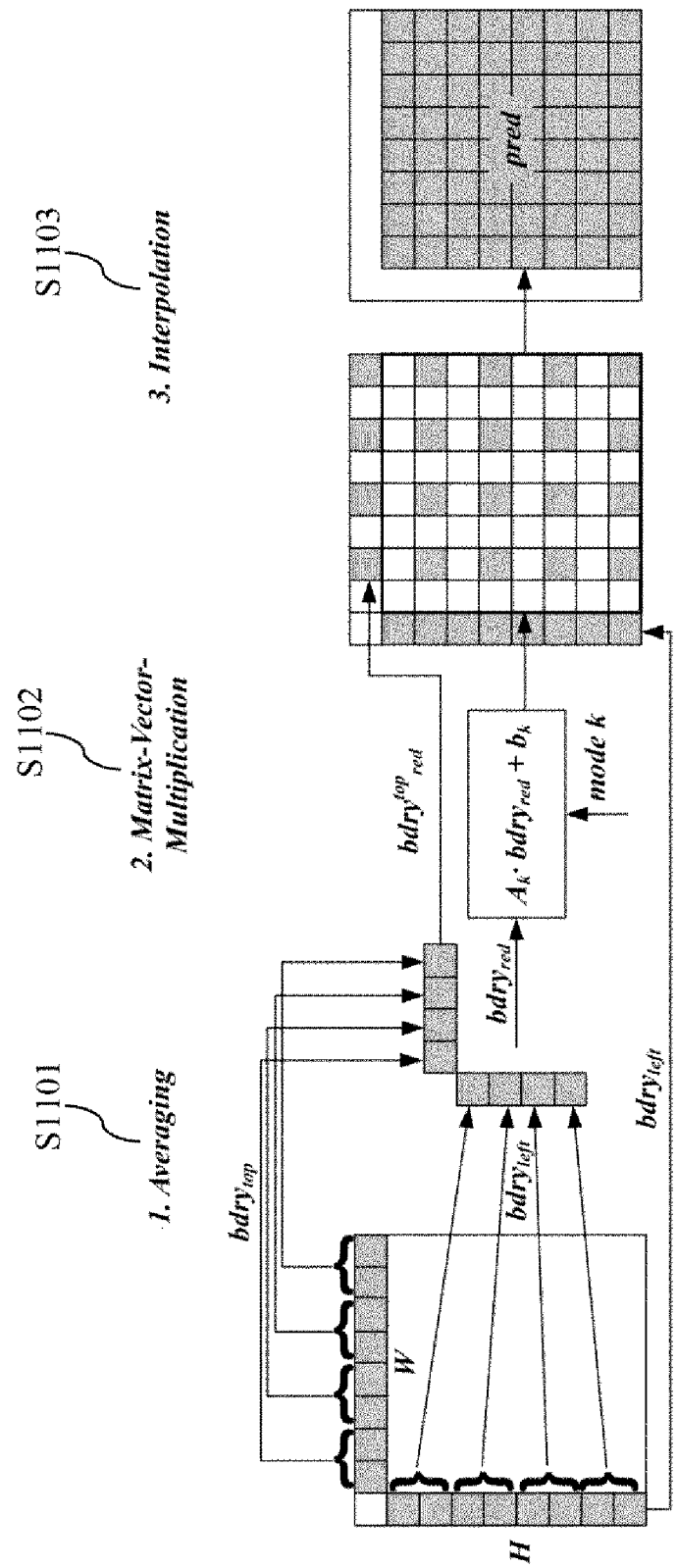
FIG. 11 is a diagram illustrating a matrix-based intra prediction process according to an embodiment of the present invention.

FIG. 11 is a diagram illustrating a matrix-based intra prediction process according to an embodiment of the present invention.

Referring to FIG. 11, in step S1101, the encoder/decoder may perform an averaging process on neighboring reference samples. The averaging process may be referred to as a down sampling process. For example, in step S1101, the reference samples $bdry_{top}$ above the current block may be expressed (or set, replaced) as an average value of a specific bundle (or number) unit. For example, in step S1101 in FIG. 11, eight reference samples in the reference samples $bdry_{top}$ may be averaged by two reference samples to generate four new (or down-sampled) reference samples, respectively. The new reference samples may be referred to as $bdry^{top}_{red}$ in FIG. 11. In the same manner, eight left reference samples $bdry^{left}$ of the current block may be down-sampled to four new reference samples $bdry^{left}_{red}$ in step S1101. In an embodiment, the number of reference samples (that is, the number of down-sampled reference samples) after the averaging process may be determined according to the size of the current prediction block.

In step S1102, the encoder/decoder may perform a matrix vector multiplication process. In other words, the encoder/decoder may apply a matrix operation to the down-sampled reference samples in step S1101. A temporary prediction sample may be generated as a result of the matrix vector multiplication process. The encoder/decoder may apply, to the result value of step S1101, a matrix vector and/or an offset value based on a specific mode. As an example, the specific mode may be expressed as mode k as shown in FIG. 11. The encoder/decoder may apply the matrix vector and the offset value to the result value of step S1101 using Equation 1 below.

$$pred_{red} = A \cdot bdry_{red} + b \qquad \text{[Equation 1]}$$

In Equation 1, A is a variable representing a matrix. In an embodiment, the matrix may be predefined in the encoder and decoder. In addition, A may include a $W_{red} \times H_{red}$ columns, and if W=H=4, it may include 4 columns, and in other cases, it may include 8 columns. In addition, b is a variable (or vector) indicating an offset, and the size may be defined as $W_{red} \times H_{red}$. According to an embodiment of the present invention, the matrix A and the vector b may be any one of three sets consisting of S0, S1, and S2. In an embodiment, S0 may consist of 18 matrices, each matrix including 16 rows, 4 columns, and 18 offset vectors. In addition, S1 may consist of 10 matrices, each matrix having 16 rows, 8 columns, and 10 offset vectors. Further, S2 may consist of 6 matrices, each matrix having 64 rows, 8 columns, and 6 offset vectors. In an embodiment, an index idx indicating a specific set among the above-described sets may be determined as in Equation 2 below.

$$idx(W, H) = \begin{cases} 0 & \text{for } W = H = 4 \\ 1 & \text{for max}(W, H) = 8 \\ 2 & \text{for max}(W, H) > 8 \end{cases} \qquad \text{[Equation 2]}$$

Further, in an embodiment, the above-described mode k may be determined based on Equation 3 below.

mode for $W=H=4$ and mode<18 mode-17 for $W=H=4$ and mode>=18 mode for max($W,H$)=8 and mode<10 mode-9 for max($W,H$)=8 and mode>=10 mode for max($W,H$)>8 and mode<6 mode-5 for max($W,H$)>8 and mode>=6 [Equation 3]

In step S1103, the encoder/decoder may perform an interpolation process on the result value of step S1102. In the present invention, the interpolation process may be referred to as an up-sampling process. The result values of step S1102 (that is, the temporary prediction sample) may be mapped to a designated position of the current prediction block. When the current prediction block is larger than the down-sampled reference sample (or reference block), single step linear interpolation is applied in the vertical direction, the horizontal direction, or both directions to generate a final prediction block (or the final prediction sample). In an embodiment, the above-described interpolation process may be applied to a block in which max(W, H)>=8, among blocks having a size of W×H. Hereinafter, a method for applying an MIP according to the size of the current processing block will be described in detail.

Figure 12:
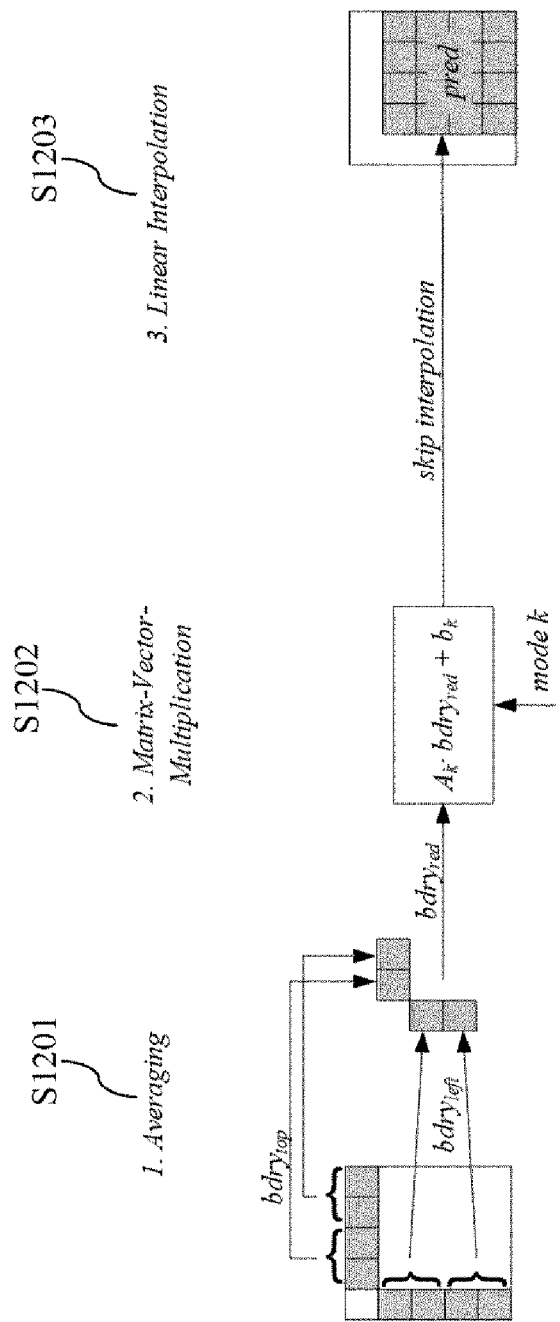
FIG. 12 is a diagram illustrating a method for applying an MIP to a block of a specific size according to an embodiment to which the present invention is applied.

FIG. 12 is a diagram illustrating a method for applying an MIP to a block of a specific size according to an embodiment to which the present invention is applied.

Referring to FIG. 12, it is assumed that the current block (or the current prediction block) is a 4×4 block. The encoder/decoder first performs an averaging process on reference samples of the current block (S1201). After the averaging process of step S1201, four new reference samples (that is, down-sampled reference samples) may be generated. The encoder/decoder performs a matrix-vector-multiplication process based on the down-sampled reference samples (S1202), and the prediction is completed without additional linear interpolation (S1203). In the case of a 4×4 block, the total number of samples of the prediction block is 16, which is the same as the result samples of step S1202. Accordingly, when the current block (or the current prediction block) is a 4×4 block, the interpolation process may be omitted.

Figure 13:
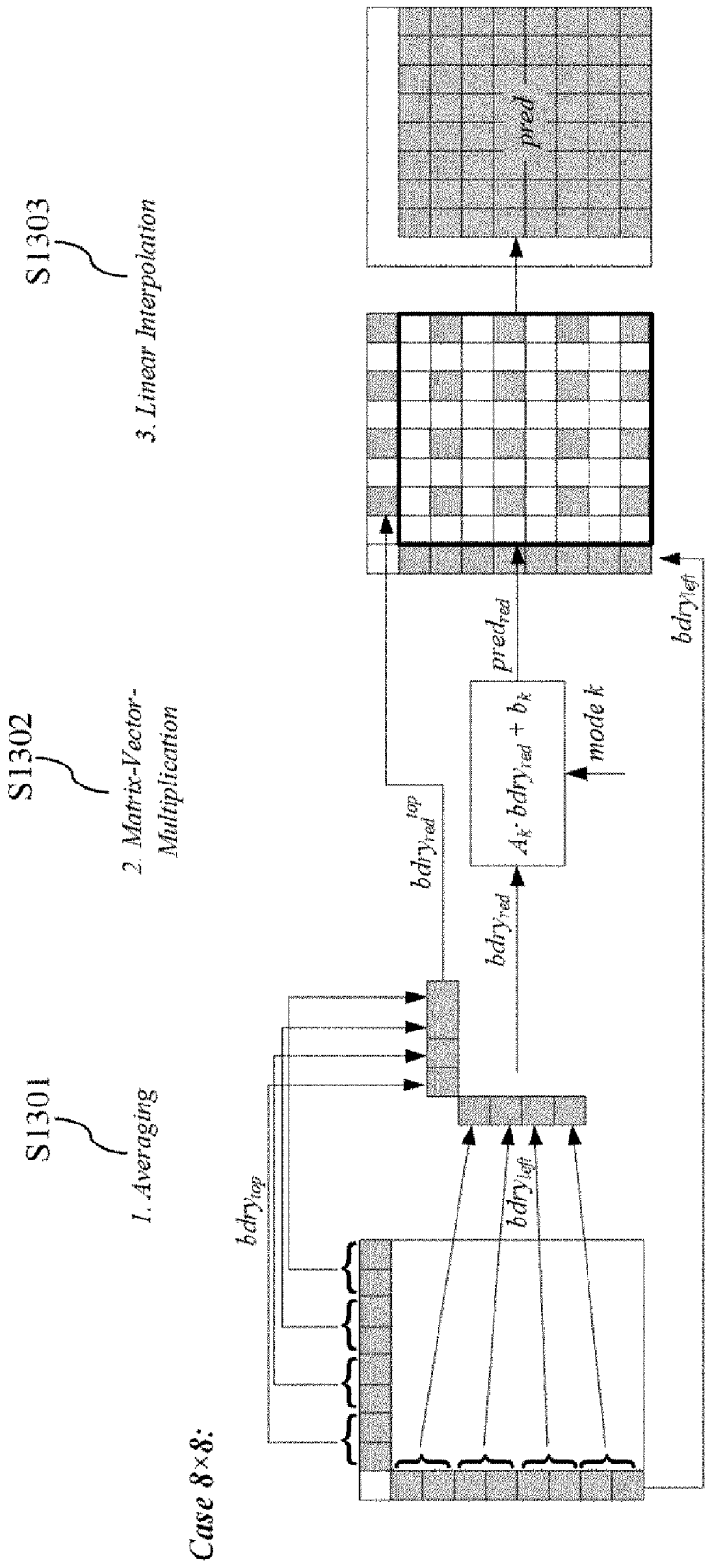
FIG. 13 is a diagram illustrating a method for applying an MIP to a block of a specific size according to an embodiment to which the present invention is applied.

FIG. 13 is a diagram illustrating a method for applying an MIP to a block of a specific size according to an embodiment to which the present invention is applied.

Referring to FIG. 13, it is assumed that the current block (or the current prediction block) is an 8×8 block. The encoder/decoder first performs the averaging process on reference samples of the current block (S1301). The encoder/decoder may generate a total of eight new reference samples (that is, down-sampled reference samples) by averaging the reference samples of the current block by two.

The encoder/decoder may generate a total of 16 new samples by performing the matrix-vector-multiplication process (S1302). As described above, in the present invention, samples generated as a result of the matrix vector multiplication process may be referred to as temporary prediction samples. In addition, as shown in FIG. 13, the encoder/decoder may map (or allocate) temporary prediction samples generated as a result of the matrix vector multiplication process to specific positions of the current prediction block.

In an embodiment of the present invention, in performing the linear interpolation process (S1303), the reference samples (that is, a down-sampled reference samples) generated by the averaging process of step S1301 may be mapped to specific positions in the reference sample corresponding to the width (that is, the horizontal reference sample or top reference sample). For example, the down-sampled reference samples above the current block may be mapped to odd-numbered positions. For the reference samples corresponding to the height (that is, the vertical reference samples or left reference sample), the reference samples used in the averaging process may be used as they are. In this case, the encoder/decoder may perform reference sample filtering on the reference samples. In an embodiment, the encoder/decoder may perform the filtering by applying upper and lower weights (or weight filters) [1,2,1] based on the current sample. Alternatively, a known method may be applied. The encoder/decoder may perform the linear interpolation process based on the mapped (or induced) reference samples.

Figure 14:
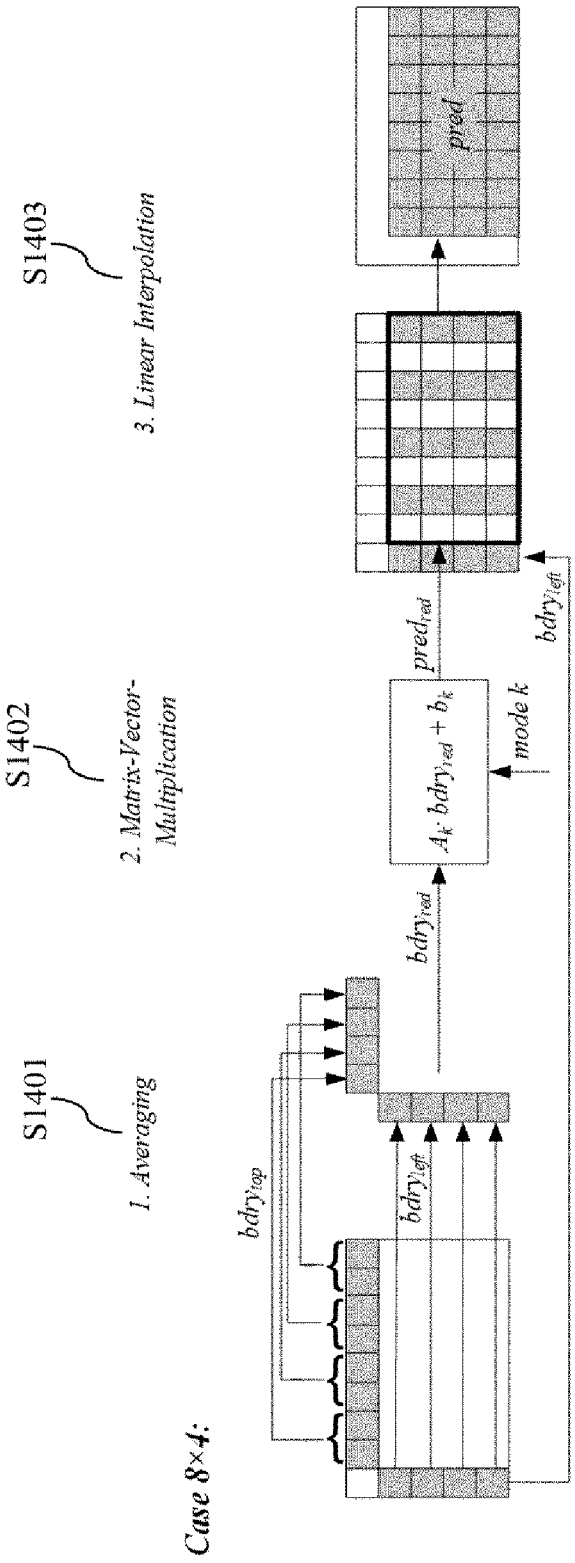
FIG. 14 is a diagram illustrating a method for applying an MIP to a block of a specific size according to an embodiment to which the present invention is applied.

FIG. 14 is a diagram illustrating a method for applying an MIP to a block of a specific size according to an embodiment to which the present invention is applied.

Referring to FIG. 14, it is assumed that the current block (or the current prediction block) is a 8×4 block. When the current block is an 8×4 block, the encoder/decoder averages eight top reference samples by two to generate four down-sampled reference samples, and the left reference samples may use the values as they are without taking the average (S1401). The encoder/decoder may generate 16 temporary prediction samples by performing the matrix vector multiplication process based on the eight new reference samples, and may map the generated temporary prediction samples to preset specific positions (S1402). The encoder/decoder performs the linear interpolation process based on the generated temporary prediction samples (S1403). In an embodiment, only vertical samples may be needed for the linear interpolation process. That is, the linear interpolation process may be performed only in the horizontal direction, and through this, a final prediction block may be generated.

Figure 15:
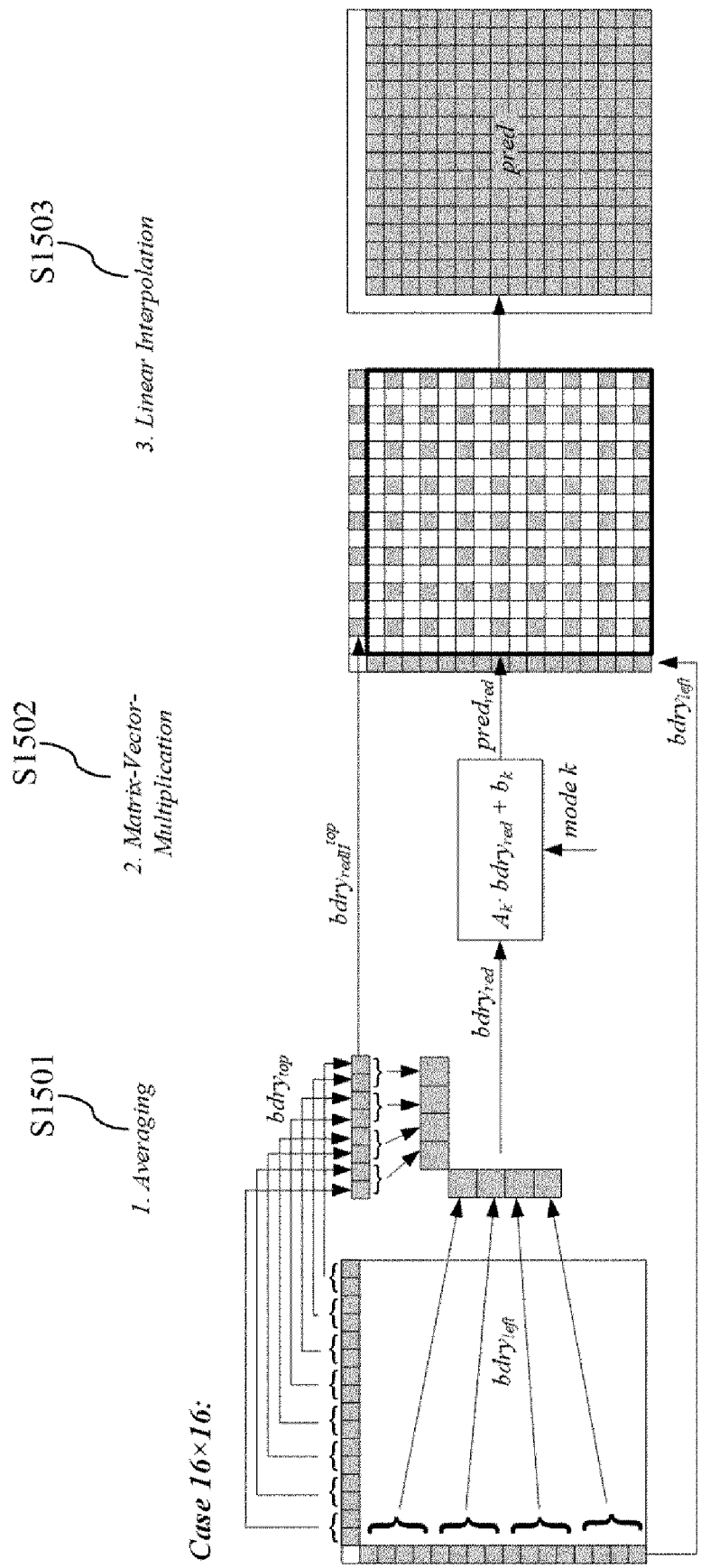
FIG. 15 is a diagram illustrating a method for applying an MIP to a block of a specific size according to an embodiment to which the present invention is applied.

FIG. 15 is a diagram illustrating a method for applying an MIP to a block of a specific size according to an embodiment to which the present invention is applied.

Referring to FIG. 15, it is assumed that the current block (or the current prediction block) is a 16×16 block. When the current block is a 16×16 block, in S1501, the encoder/decoder generates eight new reference samples (that is, down-sampled reference samples) by averaging the top reference samples by two. The generated eight down-sampled reference samples may be used for subsequent linear interpolation. In addition, the encoder/decoder may generate four new reference samples (that is, down-sampled reference samples) by averaging the eight down-sampled reference samples by two again. The encoder/decoder may generate four new reference samples (that is, down-sampled reference samples) by averaging the left reference samples by four.

In step S1502, the encoder/decoder may perform matrix vector multiplication using down-sampled reference samples, four in the vertical direction and four in the horizontal direction, and generate temporary prediction samples. Temporary prediction samples may be 64.

In step S1503, the encoder/decoder may use the eight down-sampled reference samples generated in step S1501 as horizontal reference samples for linear interpolation. In addition, as the vertical direction, the original reference samples may be used as they are for linear interpolation. In an embodiment, the linear interpolation may be applied for both horizontal and vertical directions.

FIG. 16 is a diagram illustrating an example of a coding unit syntax structure for describing a method of signaling and obtaining MIP-related information according to an embodiment of the present invention.

Referring to FIG. 16, an embodiment of the present invention will be described with a focus on a decoder, but the present invention is not limited thereto, and the syntax signaling/parsing method according to the present embodiment may be applied substantially equally to an encoder. In FIG. 16, CuPredMode[x0][y0] is a variable indicating a prediction mode of a current coding unit. The prediction mode may include any one of MODE_INTRA and MODE_INTER, and when the prediction mode is MODE_INTRA, the prediction mode of the current coding unit may be an intra prediction mode. Pcm_flag[x0][y0] represents a syntax element indicating whether the current prediction block is coded by a pulse coded modulation method.

Therefore, referring to FIG. 16, when CuPredMode[x0][y0] indicates MODE_INTRA and pcm_flag[x0][y0] indicates 0, parsing of MIP-related signaling information may be possible. In an embodiment, the MIP may be applied to a luma component. treeType is a variable indicating the split type of luma and chroma components, SINGLE_TREE may indicate that luma and chroma are split in the same way (or split structure), and DUAL_TREE_LUMA may indicate a luma component in which luma and chroma are split in different ways. When the tree type is any one of SINGLE_TREE and DUAL_TREE_LUMA, it may be possible to parse the MIP-related signaling information.

In FIG. 16, intra_lwip_flag[x0][y0] indicates a syntax element (or flag) indicating whether the MIP is applied to the current coding block. In the present invention, the intra_lwip_flag may be referred to as intra_mip_flag[x0][y0], MIP flag. In step S1601, the decoder may parse the MIP flag when a preset condition is satisfied. According to an embodiment of the present invention, a condition for parsing the MIP flag may be defined as in Equation 4 below.

$$(\text{Abs}(\text{Log 2}(cbWidth)) - \text{Log 2}(cbHeight))) <= 2 \,\&\& \\ (cbWidth <= \text{INTRA\_MIP\_MAX\_} \\ \text{WIDTH} \,\&\& \, cbHeight <= \text{INTRA\_} \\ \text{MIP\_MAX\_HEIGHT})) \quad \text{[Equation 4]}$$

In Equation 4, Abs( ) represents an operator that takes an absolute value as a result value without a sign. Furthermore, Log 2( ) represents a binary logarithm with base 2, and && in A && B represents an operator that makes the result true when both A and B are true. cbWidth is a variable representing the width of the coding block, and cbHeight is a variable representing the height of the coding block. INTRA_MIP_MAX_WIDTH is a variable representing the maximum MIP applicable width, and INTRA_MIP_MAX_HEIGHT is a variable representing the maximum MIP applicable height.

The decoder may parse the MIP flag when the current coding block satisfies the condition of Equation 4. When Abs(Log 2(cbWidth)−Log 2(cbHeight))<=2 (referred to as a first condition) in Equation 4 is satisfied, the difference between the width and the height obtained by taking log 2 may be smaller than or equal to 2. When (cbWidth<=INTRA_MIP_MAX_WIDTH && cbHeight<=INTRA_MIP_MAX_HEIGHT) (referred to as a second condition) and (cbWidth<=INTRA_MIP_MAX_WIDTH||cbHeight<=INTRA_MIP_MAX_HEIGHT) (referred to as a third condition) are satisfied in Equation 4, the width and height of the current coding block may be a block size to which a preset MIP is to be applied. For example, the block size to which the preset MIP is to be applied may be 256, 128, 64, 32, 16, 8, or 4. When the MIP flag is true, the decoder may obtain the prediction mode information used in the MIP mode by parsing intra_lwip_mpm_flag[x0][y0], and, based on this, parsing intra_lwip_mpm_idx[x0][y0] or intra_lwip_mpm_remainder[x0][y0].

FIG. 17 is a diagram illustrating an example of a coding unit syntax structure for describing a method of signaling and obtaining MIP-related information according to an embodiment of the present invention.

Referring to FIG. 17, an embodiment of the present invention will be described with a focus on the decoder, but the present invention is not limited thereto, and the syntax signaling/parsing method according to the present embodiment may be applied substantially equally to the encoder. According to an embodiment of the present invention, the decoder may determine whether to parse the MIP flag based on a syntax element (or flag) signaled at a higher level. In an embodiment, the higher level may be a sequence, a picture, a slice, or a tile. For example, the condition of Equation 4 described above with reference to FIG. 16 may include whether sps_mip_enabled_flag is true. This may be referred to as a fourth condition. In an embodiment, it may be indicated whether to use MIP through sps_mip_enabled_flag in a sequence parameter set RBSP (SPS) syntax.

FIG. 18 is a diagram illustrating an example of a coding unit syntax structure for describing a method of signaling and obtaining secondary transform-related information according to an embodiment of the present invention.

Referring to FIG. 18, an embodiment of the present invention will be described with a focus on the decoder, but the present invention is not limited thereto, and the syntax signaling/parsing method according to the present embodiment may be applied substantially equally to the encoder. The encoder may apply the primary transform to the current coding block, and then apply the secondary transform, and the decoder may apply the secondary transform (that is, inverse secondary transform) first, and then the primary transform (that is, inverse primary transform).

According to an embodiment of the present invention, the decoder may consider the value of the MIP flag in determining whether to parse the secondary transform index. In FIG. 18, st_idx[x0][y0] may represent a syntax element indicating a secondary transform kernel used for the secondary transform, and may be referred to as a secondary transform index in the present invention. In an embodiment, in step S1801, in the parsing condition of st_idx[x0][y0], a case may be included in which the intra_lwip_flag[x0][y0] value is not true. That is, the secondary transform is not applied to the block to which the MIP is applied, and only the primary transform may be applied.

FIGS. 19 and 20 are diagrams illustrating examples of a residual coding unit syntax structure for describing a method of signaling and obtaining secondary transform-related information according to an embodiment of the present invention.

Referring to FIGS. 19 and 20, embodiments of the present invention will be described with a focus on the decoder, but the present invention is not limited thereto, and the syntax signaling/parsing method according to the present embodiment may be applied substantially equally to the encoder. Referring to FIG. 19, according to an embodiment of the present invention, the decoder may define a case in which the MIP flag is not true as a condition for counting numZeroOutSigCoeff. numZeroOutSigCoeff is a variable indicating the number of zero-out significant coefficients. When the condition defined in step S1901 is satisfied, the decoder may count numSigCoeff.

Referring to FIG. 20, the decoder may define a case in which the MIP flag is not true as an upper condition in which even the variable numSigCoeff is not able to be counted. numSigCoeff is a variable indicating the number of significant coefficients. In this case, values of both numSigCoeff and numZeroOutSigCoeff variables do not exist, and accordingly, their values may be defined semantically. For example, the decoder may set (or infer) numSigCoeff to 0 and may set (or infer) numZeroOutSigCoeff to a specific value greater than 0, when the values do not exist since the two variables are not parsed. For example, the decoder may set the specific value greater than 0 to a value corresponding to a condition in which the secondary transform index (that is, st_idx[x0][y0]) may not be parsed. Alternatively, when the MIP flag is true in semantics, the value of numZeroOutSigCoeff may be set to a value greater than 0. In this case, the secondary transform may be applied only when the value of numZeroOutSigCoeff is 0. When st_idx[x0][y0] indicates 0, it may indicate that the secondary transform is not applied.

FIG. 21 is a diagram illustrating an example of a transform unit syntax structure for describing a method of signaling and obtaining transform-related information according to an embodiment of the present invention.

Referring to FIG. 21, an embodiment of the present invention will be described with a focus on the decoder, but the present invention is not limited thereto, and the syntax signaling/parsing method according to the present embodiment may be applied substantially equally to the encoder. In FIG. 21, tu_mts_idx[x0][y0] represents a syntax element indicating a transform kernel (or a transform kernel set), and may be referred to as an MTS index in the present invention. In an embodiment, when the MTS index indicates 0, a preset default transform kernel may be used. When the MTS index is greater than 0, several preset combinations of kernels may be used. In an embodiment, the decoder may use a preset basic transform kernel without parsing the MTS index to which the MIP is applied to the current block. This may reduce the complexity of the encoder and decoder.

Accordingly, in step S2101, the condition for parsing tu_mts_idx[x0][y0] may include a case where intra_lwip_flag[x0][y0] is not true. Alternatively, when intra_lwip_flag[x0][y0] is true, a transform kernel optimized for the MIP may be used instead of applying the default transform set. When one transform kernel set is constructed, the transform kernel may be determined without separate signaling/parsing.

In addition, according to an embodiment of the present invention, in inducing the prediction mode of the chroma block, the encoder/decoder may determine the prediction mode of the chroma block based on the luma mode of a specific position in the luma block corresponding to the chroma block.

In an embodiment, when the MIP mode is not applied to the luma block corresponding to the chroma block, the encoder/decoder may induce the chroma prediction mode based on the prediction mode of the corresponding luma. Further, according to an embodiment, in confirming the MIP mode in the luma block corresponding to the chroma block, the luma position may be predefined. The luma position may be a bottom right pixel position of a center of the corresponding luma block. That is, when the intra_lwip_flag [xCb+cbWidth/2][yCb+cbHeight/2] value in the corresponding luma position [xCb+cbWidth/2][yCb+cbHeight/2] indicates 0, the encoder/decoder may induce the chroma prediction mode based on the prediction mode of the corresponding luma block.

When the MIP mode is applied to the luma block corresponding to the chroma block, that is, when the MIP flag of the specific luma position indicates 1, the luma intra prediction mode used for determining (or inducing) the prediction mode of the chroma block may be mapped to the general prediction mode, and the chroma prediction mode may be induced based on the luma intra prediction mode transformed into the general prediction mode. In an embodiment, the size sizeID of the luma block including [xCb+cbWidth/2][yCb+cbHeight/2] may also be considered.

In an embodiment, when intra_lwip_flag[xCb+cbWidth/2][yCb+cbHeight/2] is true, the encoder/decoder may use a preset basic mode instead of using the prediction mode of the corresponding luma position. In other words, the prediction mode of the corresponding luma position may be set as the preset basic mode when the MIP is applied. This is because the prediction mode of the block to which the MIP is applied may have a different character from the general prediction mode, and thus may not be suitable for use as the prediction mode of the chroma block. For example, the preset basic mode may be a prediction mode (e.g., a planar mode) that is statistically selected the most.

FIG. 22 is a diagram illustrating a method for constructing a most probable mode (MPM) list according to an embodiment of the present invention.

Referring to FIG. 22, the encoder/decoder may refer to a prediction mode of a neighboring block adjacent to the current coding block 2201 in order to construct (or generate) an MPM list (or MPM candidate list) for the current coding block 2201. In an embodiment, the encoder/decoder may refer to prediction modes of an L position (left, bottom-left position) and an A position (above, above-right position) as shown in FIG. 22 to construct the MPM list. In the present specification, for convenience of description, the intra prediction mode of the L position may be briefly abbreviated as L, and the intra prediction mode of the A position may be briefly abbreviated as A.

The coordinates of the top left corner of the current coding block may be xCb, yCb. In this case, the position of L may be (xCb−1, Height−1), and the position of A may be (Width−1, yCb−1). Here, Height represents the height of the current coding block 2201, and Width represents the width of the current coding block 2201. In FIG. 22, it is assumed that the neighboring block at position A is a block predicted to be in the MIP mode and coded A block coded by the MIP may have a different prediction mode from a block predicted by other general methods. In constructing the MPM list, the encoder/decoder may map (or interpret, set) an intra prediction mode of a neighboring block at position A, which is the block coded by the MIP, into another preset prediction mode. Table 1 below illustrates a table defined by mapping a prediction mode used in a block predicted by the MIP to a general prediction mode.

TABLE 1

| IntraPredModeY | MipSizeId | | |
|---|---|---|---|
| [ xNbX ][ yNbX ] | 0 | 1 | 2 |
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

Referring to Table 1, MipSizeId may be MipSizeId [xNbX][yNbX]. For example, when intra_mip_flag[xNbX][yNbX] of a neighboring block indicates 1 to indicate that it is a block predicted with the MIP, the encoder/decoder may obtain the MipSizeId value of the neighboring block and obtain the corresponding value in Table 1. At this time, X may be L and A. Table 1 shows the relationship between the prediction mode in which the MIP is used and the general prediction mode corresponding to each MipSizeId. MipSizeId may also be expressed as MipSizeId[x][y] and may have ranges/widths for x=xCb+cbWidth ... xCb+cbWidth−1 and y=yCb ... yCb+cbHeight−1. The encoder/decoder may determine the MipSizeId value in following ways.

1) When both cbWidth and cbHeight are equal to 4, MipSizeId[x][y] is equal to 0.
2) When both cbWidth and cbHeight are less than or equal to 8, MipSizeId[x][y] is equal to 1.
3) In other cases, MipSizeId[x][y] is equal to 2.

In FIG. 22, since the block corresponding to the position of L is a block coded using the general prediction mode, not the MIP mode, the encoder/decoder may use the prediction mode of the block of the position of L in constructing the MPM list, without a separate transform process.

Accordingly, the encoder/decoder may check the value of intra_mip_flag[xNbX][yNbX] in the neighboring blocks of A and L. When intra_mip_flag[xNbX][yNbX] is 1, candIntraPredModeX may be reinterpreted (or set) as the general prediction mode from Table 1 described above according to IntraPredModeY[xNbX][yNbX] and MipSizeId[xNbX][yNbX]. Furthermore, when the value of intra_mip_flag [xNbX][yNbX] is 0, candIntraPredModeX may be equal to IntraPredModeY[xNbX] [yNbX].

The encoder/decoder may construct the MPM list based on the prediction mode of the neighboring blocks of the two positions. In the present invention, a case in which two neighboring blocks are referred to has been described as an example, but the present invention is not limited thereto, and two or more neighboring blocks may be used to construct the MPM list.

In addition, according to an embodiment of the present invention, in constructing the MPM list for the current coding block to which the MIP is not applied, when the MIP is applied to the neighboring block of a preset position, the intra prediction modes of the neighboring block of the preset position may be set as a preset mode. The preset mode may be any one of several prediction modes defined as the intra prediction mode. For example, the preset mode may be a basic prediction mode. For example, the preset mode may be a prediction mode (e.g., a planar mode) that is statistically selected the most. That is, when intra_mip_flag[xNbX][yNbX] of the neighboring block of preset position is 1, the encoder/decoder may use the preset mode as the prediction mode of the neighboring block to construct the MPM list.

Figure 23:
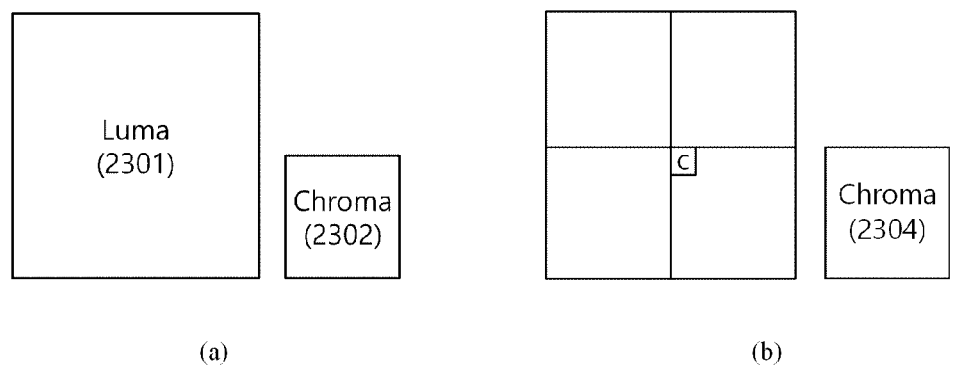
FIG. 23 is a diagram for describing a relationship between luma and chroma blocks according to a tree structure according to an embodiment of the present invention.

FIG. 23 is a diagram for describing a relationship between luma and chroma blocks according to a tree structure according to an embodiment of the present invention.

(a) of FIG. 23 shows a relationship between a chroma block and a corresponding luma block in a single tree split structure. The ratio of luma to chroma is, for example, the chroma format 4:2:0. For the DM mode in which the chroma prediction mode is used as the luma prediction mode, the value of intraPredModeY[xCb][yCb] in the LT (left-top) position (xCb,yCb) coordinates of the left-top corner of the luma coding block may be used. In addition, the encoder/decoder may check the value of intra_mip_flag[xCb][yCb] at the position. When the value is 1, the encoder/decoder may obtain the value of MipSizeId[xCb][yCb] at the corresponding position when it is indicated that the MIP prediction mode is used, and then reinterpret it as the general prediction mode using Table 2 below and use it as the chroma prediction mode.

TABLE 2

| IntraPredModeY | MipSizeId | | |
|---|---|---|---|
| [ xNbX ][ yNbX ] | 0 | 1 | 2 |
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |

TABLE 2-continued

| IntraPredModeY | MipSizeId | | |
|---|---|---|---|
| [ xNbX ][ yNbX ] | 0 | 1 | 2 |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

(b) of FIG. 23 shows a relationship between a chroma block and a corresponding luma block in a dual tree split structure. In the corresponding split structure, splitting methods for chroma and luma may be different. The chroma format has, for example, a structure of 4:2:0. In the case of a direct mode (DM) mode in which the chroma prediction mode is used as the luma prediction mode, the intraPredModeY value of position C of (b) of FIG. 23 may be used. That is, the DM mode may be IntraPredModeY[xCb+cbWidth/2][yCb+cbHeight/2] in consideration of position C.

Therefore, in the chroma intra prediction mode, the value of intra_mip_flag[xCb+cbWidth/2][yCb+cbHeight/2] corresponding to position C in the corresponding luma block is checked, and when the check result indicates 1, the value of IntraPredModeY[xCb+cbWidth/2] [yCb+cbHeight/2] and MipSizeId[xCb+cbWidth/2][yCb+cbHeight/2] may be obtained, and may be reinterpreted in the general prediction mode using the mapping method shown in Table 16-1 and used as the chroma intra prediction mode. In another case, if the value of intra_mip_flag[xCb+cbWidth/2][yCb+cbHeight/2] is 0, the value of IntraPredModeY[xCb+cbWidth/2][yCb+cbHeight/2] may be used as it is. In the present invention, only the position of C has been described by way of example, but the present invention is not limited thereto, and the position may be a designated coordinate and may be a plurality of positions.

In the single tree structure of FIG. 23, intra_mip_flag, intraPredModeY, and MipSizeId are checked based on the LT position as an example, but in the single tree structure, the luma block corresponding to chroma is one block, and the three values may be the same. Therefore, in the dual tree structure, the reference positions of the two splitting methods may be set to be the same, such as referring to position C. Even in the single tree structure, the coordinates of [xCb+cbWidth/2][yCb+cbHeight/2] may be used instead of LT to refer to the same place as the dual tree structure. This may simplify the implementation of software/hardware.

The chroma format, the number and position of neighboring blocks that are referred to, the position of C in the dual tree structure, and tables 1 and 2 reinterpreting the MIP mode as the general prediction mode, which have been illustrated in the above embodiment, are examples, and the present invention is not limited thereto.

According to an embodiment of the present invention, when the luma coding block is a mode using the MIP, the encoder/decoder may use the luma intra prediction mode as the preset mode when determining the chroma prediction mode. For example, when the value of intra_mip_flag[x][y] stored in the designated position of the luma block corresponding to chroma is equal to 1, intraPredModeY[x][y] may be set (or used) as the preset mode. The preset mode may be one of intra prediction modes. For example, the preset mode may be a basic prediction mode. For example, the preset mode may be a prediction mode (e.g., the planar mode) that is statistically selected the most.

Figure 24:
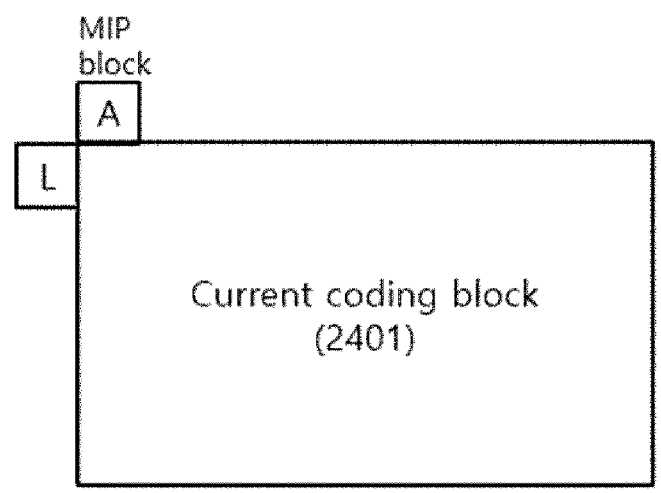
FIG. 24 is a diagram illustrating a method for constructing a most probable mode (MPM) list according to an embodiment of the present invention.

FIG. 24 is a diagram illustrating a method for constructing a most probable mode (MPM) list according to an embodiment of the present invention.

Referring to FIG. 24, when the current prediction block uses the MIP, the method for constructing the MPM may be as follows. The encoder/decoder may construct the MPM list for the MIP by using prediction mode values of neighboring blocks A and L. In an embodiment, the position of L may be (xCb−1, yCb), and the position of L may be (xCb, yCb−1). The left-top position of the current prediction block may be (xCb, yCb). candMipModeX may be obtained as follows. In this case, X may be L and A.

The encoder/decoder sets candMipModeX to −1 when one or more of the following conditions are satisfied.
1. When the availableX variable is false.
2. When CuPredMode[xNbX][yNbX] is not MODE_INTRA, and ciip_flag[xNbX][yNbX] is not 1.
3. When pcm_flag[xNbX][yNbX] is not 1.
4. When X is equal to B, and yCb−1 is less than ((yCb>>Ctb Log 2SizeY)<<Ctb Log 2SizeY).

In an embodiment, in a case different from the above, the encoder/decoder applies following methods.
1) When intra_mip_flag[xNbX][yNbX] is equal to 1.

It is checked whether MipSizeId[xCb][yCb] and MipSizeId[xNbX][yNbX] are the same, and then, when the check result indicates that the two are equal to each other, candMipModeX is set to the value of IntraPredModeY[xNbX][yNbX], and when MipSizeId[xCb][xCb] and MipSizeId[xCb]yNbX] are not equal to each other, candMipModeX is set to −1.
2) When intra_mip_flag[xNbX][yNbX] is not equal to 1.
candMipModeX may be reinterpreted/mapped as/to the prediction mode by the MIP in Table 3 based on the values of IntraPredModeY[xNbX][yNbX] and MipSizeId[xCb][yCb]. In Table 3, MipSizeId may be MipSizeId[xCb][yCb].

TABLE 3

| IntraPredModeY | MipSizeId | | |
|---|---|---|---|
| [ xNbX ][ yNbX ] | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |

TABLE 3-continued

| IntraPredModeY | MipSizeId | | |
|---|---|---|---|
| [ xNbX ][ yNbX ] | 0 | 1 | 2 |
| 38, 39 | 22 | 12 | 6 |
| 40, 41 | 22 | 12 | 6 |
| 42, 43 | 12 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

In the method of constructing the MPM list of the coding block using the MIP as described above, as the positions of the neighboring blocks, the positions of neighboring blocks A and L of the coding block that do not use the MIP of FIG. 22 may be used instead of the positions of A and L of FIG. 24. This makes it possible to refer to one unified neighboring block position when implementing HW/SW, thereby simplifying implementation. Alternatively, in a reverse case, one unified neighboring block position may be referred to.

When the current coding block is a block using the MIP and there is a block coded without using MIP among neighboring blocks, the MPM of the current MIP block may be considered as follows. The prediction mode preset for each block MIP size of the current block may be used. When there are three case for the MIP size, the prediction mode preset for each size may be used. When MipSizeId is 0, the prediction mode may be set to mode 17, when 1, set to mode 0, and when 2, set to mode 1. The prediction mode may be determined by a statistically frequently used mode for each MipSizeId. In another case, one preset prediction mode may be used without considering the MIP size. The preset prediction mode may be a mode used as the intra prediction mode. The value may be a PLANA mode. However, the present invention is not limited thereto.

Figure 25:
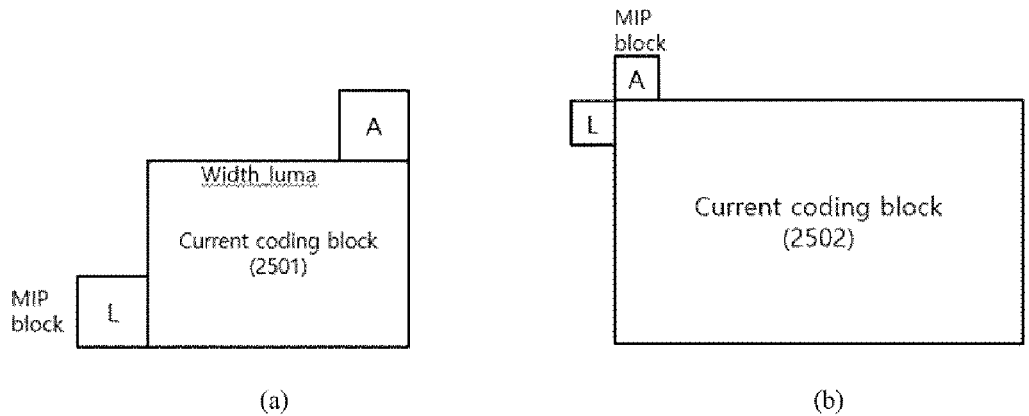
FIG. 25 is a diagram illustrating a neighboring block that is referred to in constructing an MPM list according to an embodiment of the present invention.

FIG. 25 is a diagram illustrating a neighboring block that is referred to in constructing an MPM list according to an embodiment of the present invention.

In (a) of FIG. 25, the current block is a general coding block that does not use the MIP, and the positions of neighboring reference blocks refer to the content previously described in FIG. 22. In addition, (b) of FIG. 25 is a diagram illustrating a relationship between the current coding block using the MIP and neighboring reference blocks, and the positions of the neighboring reference blocks refer to the previously described content of FIG. 24.

In an embodiment, there are two cases in the method using the preset mode without using Tables 1, 2, and 3. The method may be divided into a case in which, as in (a) of FIG. 25, at least one of the neighboring blocks is coded by the MIP in the current block that does not use the MIP, and a case in which, as in (b) of FIG. 25, the current block is a block using the MIP and there is a coding block that does not use the MIP among neighboring blocks. The former is referred to as a first case and the latter is referred to as a second case. Only in the first case, the preset mode may be used. Only in the second case, the preset mode may be used. Alternatively, in both the first case and the second case, the preset mode may be used to induce the MPM. The method of using the preset mode described in FIG. 22, the method of using the preset mode described in FIG. 23, and the method of using the preset mode described in FIG. 24 may be applied. In (a) of FIG. 25 and (b) of FIG. 25, the position that refers to a neighboring block is an embodiment, and regardless of the position, the preset mode may be applied in consideration of whether the current block uses the MIP and whether the neighboring block uses the MIP.

Although the above has been described in terms of the decoder, the same may be applied to the encoder as well. In the above, the term "parsing" has been described with emphasis on the process of obtaining information from a bit stream, but in terms of the encoder, it may be interpreted as constructing the corresponding information in the bit stream. Therefore, the term "parsing" is not limited to a decoder operation, and may be interpreted as an act of constructing a bit stream in an inco.

Figure 26:
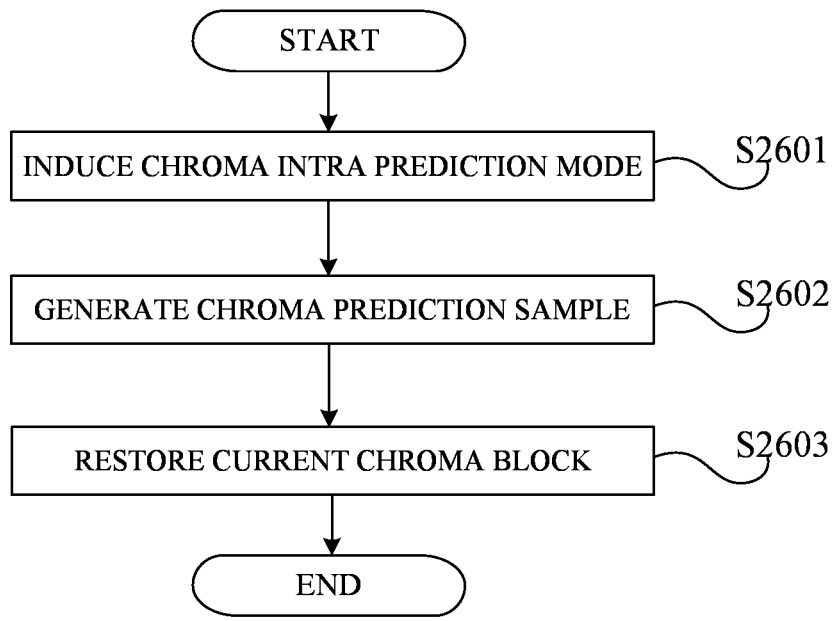
FIG. 26 is a flowchart illustrating a method for processing a video signal according to an embodiment of the present invention.

FIG. 26 is a flowchart illustrating a method for processing a video signal according to an embodiment of the present invention. Referring to FIG. 26, for convenience, description will be given with a focus on the decoder, but the present invention is not limited thereto, and the method for processing a video signal according to the present embodiment may be applied substantially equally to the encoder.

The decoder induces a chroma intra prediction mode applied to a current chroma block based on a luma intra prediction mode of a luma block corresponding to the current chroma block (S2601).

The decoder generates a chroma prediction sample of the current chroma block based on the chroma intra prediction mode (S2602).

The decoder restores the current chroma block based on the chroma prediction sample (S2603).

In an embodiment, the luma intra prediction mode may be set to a preset specific mode based on whether a matrix-based intra prediction (MIP) mode is applied to the luma block corresponding to the current chroma block.

Furthermore, as described above, whether the MIP mode is applied to the luma block corresponding to the current chroma block may be determined according to an MIP flag value of a preset specific luma position, and the MIP flag may indicate whether the MIP mode is applied.

In addition, as described above, the preset specific luma position may be a bottom right pixel position of a center of a luma block corresponding to the current chroma block.

In addition, as described above, the decoder may parse an MIP flag indicating whether the MIP mode is applied to a current luma block. The decoder may generate a luma prediction sample of the current luma block by applying the MIP to the current luma block when the MIP mode is applied to the current luma block. The decoder may generate a residual block of the current luma block by performing an inverse transform on the current luma block. The decoder may restore the current luma block based on the luma prediction sample and the residual block of the current luma block.

In addition, as described above, the decoder may determine, based on the MIP flag, whether to use an inverse secondary transform of the current luma block and whether to parse a secondary transform index indicating a transform kernel used for the inverse secondary transform.

In addition, as described above, the decoder may obtain a syntax element indicating whether the MIP mode is to be used in a current sequence, and determine whether to parse the MIP flag based on the obtained syntax element.

In addition, as described above, the decoder may generate a most probable mode (MPM) list of the current luma block based on intra prediction modes of neighboring blocks adjacent to a bottom left and a top right of the current luma block, when the MIP mode is not applied to the current luma block. The decoder may induce a luma intra prediction mode of the current luma block based on the MPM list. The decoder may generate a luma prediction sample of the current luma block by using the luma intra prediction mode.

In addition, as described above, when the MIP mode is applied to at least one block among the neighboring blocks adjacent to the bottom left and the top right of the current luma block, the intra prediction mode of the block to which the MIP mode is applied may be set to a preset specific intra prediction mode.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A method for decoding a video signal, comprising:
inducing a chroma intra prediction mode applied to a current chroma block based on a luma intra prediction mode of a luma block corresponding to the current chroma block;
generating a chroma prediction sample of the current chroma block based on the chroma intra prediction mode; and
restoring the current chroma block based on the chroma prediction sample,
wherein the chroma intra prediction mode applied to the current chroma block is induced based on a preset specific luma intra prediction mode when a matrix-based intra prediction (MIP) mode is applied to the luma block corresponding to the current chroma block.

2. The method of claim 1, wherein whether the MIP mode is applied to the luma block corresponding to the current chroma block is determined according to an MIP flag value of a preset specific luma position, and
the MIP flag indicates whether the MIP mode is applied.

3. The method of claim 2, wherein the preset specific luma position is a bottom right pixel position of a center of a luma block corresponding to the current chroma block.

4. The method of claim 1, further comprising:
parsing an MIP flag indicating whether the MIP mode is applied to a current luma block;
generating a luma prediction sample of the current luma block by applying the MIP to the current luma block when the MIP mode is applied to the current luma block;
generating the luma prediction sample of the current luma block without applying the MIP to the current luma block when the MIP mode is not used for the current luma block;
generating a residual block of the current luma block by performing an inverse transform on the current luma block; and
restoring the current luma block based on the luma prediction sample and the residual block of the current luma block.

5. The method of claim 4, wherein the generating the residual block of the current luma block includes determining, based on the MIP flag, whether to use an inverse LFNST (low frequency non-separable transform) of the current luma block and whether to parse a LFNST index indicating a transform kernel used for the inverse LFNST.

6. The method of claim 4, wherein the parsing of the MIP flag includes:
obtaining a syntax element indicating whether the MIP mode is to be used in a current sequence, and
determining whether to parse the MIP flag based on the obtained syntax element.

7. The method of claim 4, further comprising:
generating a most probable mode (MPM) list of the current luma block based on intra prediction modes of neighboring blocks adjacent to a bottom left and a top right of the current luma block, when the MIP mode is not applied to the current luma block;
inducing a luma intra prediction mode of the current luma block based on the MPM list; and
generating a luma prediction sample of the current luma block by using the luma intra prediction mode.

8. The method of claim 7, wherein when the MIP mode is applied to at least one block among the neighboring blocks adjacent to the bottom left and the top right of the current luma block, a luma intra prediction mode of the block to which the MIP mode is applied is set to the preset specific luma intra prediction mode.

9. A device for decoding a video signal, comprising:
a processor,
wherein the processor is configured to:
induce a chroma intra prediction mode applied to a current chroma block based on a luma intra prediction mode of a luma block corresponding to the current chroma block;
generate a chroma prediction sample of the current chroma block based on the chroma intra prediction mode; and
restore the current chroma block based on the chroma prediction sample, and
the chroma intra prediction mode applied to the current chroma block is induced based on a preset specific luma intra prediction mode when a matrix-based intra prediction (MIP) mode is applied to the luma block corresponding to the current chroma block.

10. The device of claim 9, wherein whether the MIP mode is applied to the luma block corresponding to the current chroma block is determined according to an MIP flag value of a preset specific luma position, and
the MIP flag indicates whether the MIP mode is applied.

11. The device of claim 10, wherein the preset specific luma position is a bottom right pixel position of a center of a luma block corresponding to the current chroma block.

12. The device of claim 9, wherein the processor is configured to:
parse an MIP flag indicating whether the MIP mode is applied to a current luma block;
generate a luma prediction sample of the current luma block by applying the MIP to the current luma block when the MIP mode is applied to the current luma block;
generate the luma prediction sample of the current luma block without applying the MIP to the current luma block when the MIP mode is not used for the current luma block;
generate a residual block of the current luma block by performing an inverse transform on the current luma block; and
restore the current luma block based on the luma prediction sample and the residual block of the current luma block.

13. The device of claim 12, wherein the processor is configured to:
determine, based on the MIP flag, whether to use an inverse LFNST (low frequency non-separable transform) of the current luma block and whether to parse a LFNST index indicating a transform kernel used for the inverse LFNST.

14. The device of claim 12, wherein the processor is configured to:
obtain a syntax element indicating whether the MIP mode is to be used in a current sequence, and
determine whether to parse the MIP flag based on the obtained syntax element.

15. The device of claim 12, wherein the processor is configured to:
generate a most probable mode (MPM) list of the current luma block based on intra prediction modes of neighboring blocks adjacent to a bottom left and a top right of the current luma block, when the MIP mode is not applied to the current luma block;

induce a luma intra prediction mode of the current luma block based on the MPM list; and generate a luma prediction sample of the current luma block by using the luma intra prediction mode.

16. The device of claim 15, wherein when the MIP mode is applied to at least one block among the neighboring blocks adjacent to the bottom left and the top right of the current luma block, a luma intra prediction mode of the block to which the MIP mode is applied is set to a preset specific luma intra prediction mode.

17. A non-transitory computer-executable medium storing a bitstream, the bitstream being decoded by a decoding method, wherein the decoding method comprises:

inducing a chroma intra prediction mode applied to a current chroma block based on a luma intra prediction mode of a luma block corresponding to the current chroma block;

generating a chroma prediction sample of the current chroma block based on the chroma intra prediction mode; and restoring the current chroma block based on the chroma prediction sample, wherein the chroma intra prediction mode applied to the current chroma block is induced based on a preset specific luma intra prediction mode when a matrix-based intra prediction (MIP) mode is applied to the luma block corresponding to the current chroma block.

18. A method for encoding a video signal, comprising:

inducing a chroma intra prediction mode applied to a current chroma block based on a luma intra prediction mode of a luma block corresponding to the current chroma block;

generating a chroma prediction sample of the current chroma block based on the chroma intra prediction mode; and restoring the current chroma block based on the chroma prediction sample, wherein the chroma intra prediction mode applied to the current chroma block is induced based on a preset specific luma intra prediction mode when a matrix-based intra prediction (MIP) mode is applied to the luma block corresponding to the current chroma block.

* * * * *